United States Patent
Kou et al.

(10) Patent No.: US 9,670,350 B2
(45) Date of Patent: Jun. 6, 2017

(54) POLYMER DISPERSANTS

(71) Applicant: BASF SE, Ludwigshafen (DE)

(72) Inventors: Huiguang Kou, Viernheim (DE);
Clemens Auschra, Freiburg (DE);
Frank Pirrung, Gruentstadt (DE);
Matthias Maier, Sandhausen (DE);
Dario Perera-Diez, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/896,581

(22) PCT Filed: Jun. 6, 2014

(86) PCT No.: PCT/EP2014/061778
§ 371 (c)(1),
(2) Date: Dec. 7, 2015

(87) PCT Pub. No.: WO2014/195440
PCT Pub. Date: Dec. 11, 2014

(65) Prior Publication Data
US 2016/0102198 A1    Apr. 14, 2016

(30) Foreign Application Priority Data
Jun. 7, 2013  (EP) .................................... 13171083

(51) Int. Cl.
| C08F 8/32 | (2006.01) |
| C08L 25/14 | (2006.01) |
| C09D 11/10 | (2014.01) |
| C08F 212/08 | (2006.01) |
| C09D 11/00 | (2014.01) |
| C09D 125/14 | (2006.01) |

(52) U.S. Cl.
CPC ................ *C08L 25/14* (2013.01); *C08F 8/32* (2013.01); *C08F 212/08* (2013.01); *C09D 11/00* (2013.01); *C09D 11/10* (2013.01); *C09D 125/14* (2013.01)

(58) Field of Classification Search
CPC .... C08F 271/02; C08F 267/04; C08F 267/10; C08F 8/32
See application file for complete search history.

(56) References Cited

U.S. PATENT DOCUMENTS

| 4,180,644 A | 12/1979 | Marquis et al. |
| 4,191,706 A | 3/1980 | Marquis et al. |

(Continued)

FOREIGN PATENT DOCUMENTS

| DE | 10 2006 062 439 | 7/2008 |
| DE | 10 2010 049 642 | 1/2012 |

(Continued)

OTHER PUBLICATIONS

Messiha, Journal of Applied Polymer Science, vol. 25, p. 51-58 (1980).*

(Continued)

*Primary Examiner* — Robert C Boyle
(74) *Attorney, Agent, or Firm* — Oblon, McClelland, Maier & Neustadt, L.L.P.

(57) ABSTRACT

The present invention relates to novel polymer dispersants in the form of comb polymers P and to a liquid composition containing solid fine particles, such as organic or inorganic pigments and fillers, and the polymer dispersants. The comb polymer P having at least 0.5 mol-%, e.g. 0.5 to 90 mol-%, based on the total amount of repeating units in the comb polymer, of repeating units A, selected from repeating units of the formulae Ia and Ib: wherein $R^1$ is selected from the group consisting of hydrogen, $-S(=O)_2R^a$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl; and X indicates a polymer group of the following formula X wherein Z indicates a polymer segment or a monovalent alkyl or alkenyl segment having from 10 to 100 carbon atoms; R1 is as defined above; k is 0, 1, 2, 3 or 4; n is 0, 1 or 2; A is a chemical bond or a divalent moiety selected from the group consisting of $C_1$-$C_6$ alkylene, $-O-(C_2$-$C_6$ alkylene) or $-C(=O)-O-(C_2$-$C_6$ alkylene), where the $C_2$-$C_6$ alkylene part is attached to Q; Q is a divalent moiety selected from the group consisting of $-O-$, $-NH-$ and $-S-$; $R^2$ is independently selected from the group consisting of $-OH$, $-COOH$, $-COOCH_3$, $-NH_2$, $-NH(C_1$-$C_6$ alkyl), $-N(C_1$-$C_6$ alkyl)$_2$, $-NO_2$, $-S(=O)_2R^a$, $C_1$-$C_{20}$ alkyl, $C_1$-$C_4$ alkoxy, halogen, aryloxy, aryl, heteroaryl.

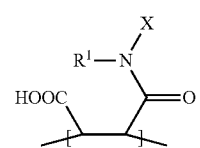

(Ia)

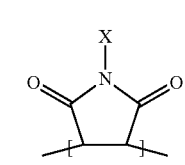

(Ib)

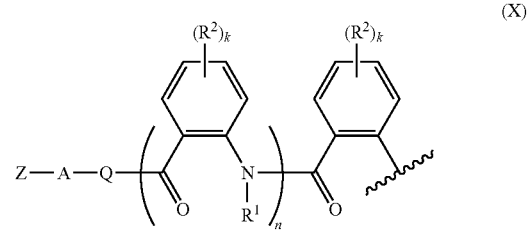

(X)

25 Claims, No Drawings

(56) References Cited

U.S. PATENT DOCUMENTS

| | | | |
|---|---|---|---|
| 4,191,835 A | 3/1980 | Habermeier et al. | |
| 4,247,677 A | 1/1981 | Schmidt et al. | |
| 4,260,729 A | 4/1981 | Schmidt et al. | |
| 5,231,149 A | 7/1993 | Longley et al. | |
| 2003/0212291 A1 | 11/2003 | Gajewski et al. | |
| 2010/0022662 A1* | 1/2010 | Gobelt | B01F 17/005 |
| | | | 514/772.3 |
| 2010/0029834 A1 | 2/2010 | Goebelt et al. | |
| 2010/0099813 A1 | 4/2010 | Goebelt et al. | |
| 2014/0024749 A1* | 1/2014 | Shooter | C08F 220/06 |
| | | | 524/90 |

FOREIGN PATENT DOCUMENTS

| | | |
|---|---|---|
| EP | 0 021 569 | 7/1981 |
| WO | 92 13911 | 8/1992 |
| WO | 00 40630 | 7/2000 |
| WO | 02 051948 | 7/2002 |
| WO | 03 046029 | 6/2003 |
| WO | 2006 074969 | 7/2006 |
| WO | 2007 039603 | 4/2007 |
| WO | 2008 080580 | 7/2008 |
| WO | 2011 120947 | 10/2011 |
| WO | 2013 124830 | 8/2013 |

OTHER PUBLICATIONS

Attia, Polymer Bulletin, vol. 34, p. 377-383 (1985).*
International Search Report Issued Sep. 17, 2014 in PCT/EP2014/061778 Filed Jun. 6, 2014.

* cited by examiner

POLYMER DISPERSANTS

The present invention relates to novel polymer dispersants and to a liquid composition containing solid fine particles, such as organic or inorganic pigments and fillers, and the polymer dispersants.

BACKGROUND OF INVENTION

Dispersions containing solid dispersible particles, such as organic or inorganic pigments and fillers, and polymer additives, namely dispersants, are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of polymeric dispersant in such dispersions is manifold. Mainly, they act as stabilizers for the solid fine particulate materials, i.e. the dispersant separates the particles of the solid fine particulate material and thus prevents them from coagulation or clumping and settling from the liquid phase. They also may act as solubilisers in the given carrier liquid, e.g. water or organic solvents. Polymer additives may also improve the gloss of the dispersion or enhance its rheology. Depending on the type and polarity of the dispersing agent, e.g. water, organic solvents or mixtures thereof, polymers of variable structures are chosen. In view of ecological requirements, the use of aqueous pigment dispersions is particularly preferred, as well as dispersions based on organic solvents with high solids content.

In view of the almost unlimited range of different technical applications, there remains a growing need for dispersants of improved pigment affinity and rheology behaviour, as expressed by the viscosity of the mill base at a given shear rate and improved gloss of surface coatings.

WO 92/13911A1 relates to acetoacetanilide functionalized poly(alkylene glycol)s which are prepared by reacting a poly(alkylene glycol)monoamine, diamine or triamine with isatoic anhydride followed by acetoacetylation of the resultant aminobenzamide. WO 92/13911A1 suggests using said acetoacetanilide functionalized poly(alkylene glycol)s for preparing improved diarylide pigment compositions which, in turn, are useful for preparing storage stable printing inks, especially of the publication gravure type inks.

Occasionally, the use of comb copolymers, in particular those based on styrene and maleic anhydride (so called SMA resins), as wetting and dispersing agents for pigment and filler dispersions, has been described. The backbone of said comb polymers is usually designed as anchoring groups which have affinity onto the solid particle surface and thereby provide a strong physical binding of the dispersant to the solid particles. Their side chains can interact with the dispersant phase to build up a steric environment to stabilize particle dispersion.

WO 2002/051948 describes pigment dispersants which are comb polymers obtained by polymerizing an acrylate monomer, a vinylaromatic hydrocarbon monomer, a non-functional polyalkylene glycol acrylate or methacrylate monomer and a functional polyalkylene glycol acrylate or methacrylate monomer having a hydroxyl group subsequently reacting the thus obtained comb polymer with an acid having a first functional acid group reactive with said hydroxyl group, and a second functional acid group capable of providing an acid anion group.

WO 2007/039603 describes a pigment dispersant which is a comb polymer having pendent hydrophilic polyalkylene oxide side chains which are obtained e.g. by reacting an SMA type polymer with a polyalkyleneoxide amine.

WO 2008/080580 describes modified comb copolymers based on SMA resins and their use as wetting and dispersing agents, where the comb copolymers are obtained by converting SMA resins with one of the following mixtures (a) to (c), where (a) is mixture of at least one polyalkylene oxide monoamine and at least one amino alcohol; (b) is a mixture of at least one polyalkylene oxide monoamine and at least one N,N-disubstituted diamine, (c) is a mixture of at least one polyalkylene oxide monoamine, at least one N,N-disubstituted diamine and at least one polymer selected from the group of monohydroxy-terminated polyalkylene oxides, monohydroxy-terminated polyesters and monohydroxy-terminated block copolymers comprising polyalkylene oxide and polyester blocks. These comb copolymers may be further modified by converting the hydroxy-terminated side chains to phosphoric acid ester groups or by converting N,N-disubstituted aminoterminated side chains to quaternary ammonium salts.

The earlier filed international patent application PCT/IB2013/051454 describes polymers having pending anthranilate or anthranilamide groups which may be attached directly or via a bivalent spacer to the polymer back-bone or to the termini of the polymers and their use as pigment dispersants.

SUMMARY OF INVENTION

It has now surprisingly found that comb polymers having at least 0.5 mol-%, in particular at least 1 mol-% and especially at least 5 mol-% of repeating units of the formulae Ia and/or Ib as defined hereinafter have beneficial properties in that they have superior affinity to solid particles, in particular to organic and inorganic pigments and fillers and thus show dispersion effects for these particles in solvent-based or water-based pigments and/or fillers containing compositions, such as coating compositions, inks, millbase, etc. Apart from that they show improved rheology behaviour and improved gloss of surface coatings. These comb polymers have not been described so far.

It was also surprisingly found that polymer compositions which are obtained by neutralizing a polymer P3 which is a polymer having at least 0.5 mol-%, in particular at least 1 mol-% and especially at least 5 mol-% based on the total amount of repeating units in the polymer P3, of repeating units of polymerized monoethylenically unsaturated mono- or dicarboxylic acid with a polymer of formula II as defined hereinafter have similar beneficial dispersion effects for organic and inorganic pigments and fillers in solvent-based or water-based pigments and/or fillers containing compositions, such as coating compositions, inks, millbase, etc. Apart from that they show improved rheology behaviour and improved gloss of surface coatings. These polymer compositions have not been described so far.

Therefore, a first aspect of the present invention relates to comb polymer P having at least 0.5 mol-%, in particular at least 1 mol-%, especially at least 5 mol-%, e.g. 0.5 to 90 mol-%, in particular from 1 to 70 mol-% and especially from 5 to 60 mol-%, based on the total amount of repeating units in the comb polymer, of repeating units A, selected from repeating units of the formulae Ia and Ib:

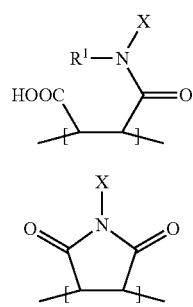

(Ia)

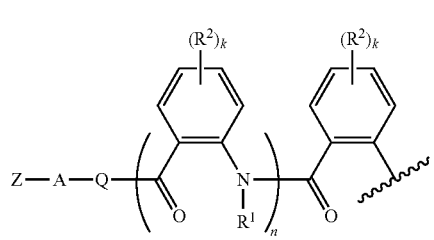

(Ib)

wherein
R¹ is selected from the group consisting of hydrogen, —S(=O)₂Rᵃ, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the four last mentioned radicals are unsubstituted or substituted by 1, 2, 3 or 4 radicals selected from the group consisting of —OH, —COOH, —COOCH₃, —NH₂, —NH($C_1$-$C_6$ alkyl), —N($C_1$-$C_6$ alkyl)₂, —NO₂, —S(=O)₂Rᵃ, $C_1$-$C_4$ alkyl, $C_1$-$C_4$ alkoxy and halogen; and
X indicates a polymer group of the following formula X

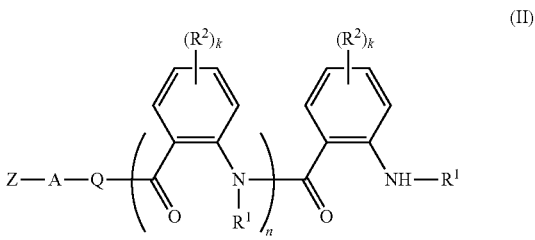

(X)

wherein
Z indicates a polymer segment or a monovalent alkyl or alkenyl segment having from 10 to 100 carbon atoms;
R¹ is as defined above;
k is 0, 1, 2, 3 or 4;
n is 0, 1 or 2;
A is a chemical bond or a divalent moiety selected from the group consisting of $C_1$-$C_6$ alkylene, —O—($C_2$-$C_6$ alkylene) or —C(=O)—O—($C_2$-$C_6$ alkylene), where the $C_2$-$C_6$ alkylene part is attached to Q;
Q is a divalent moiety selected from the group consisting of —O—, —NH— and —S—;
R² is independently selected from the group consisting of —OH, —COOH, —COOCH₃, —NH₂, —NH($C_1$-$C_6$ alkyl), —N($C_1$-$C_6$ alkyl)₂, —NO₂, —S(=O)₂Rᵃ, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH₃, —NH₂, —NH($C_1$-$C_6$ alkyl), —N($C_1$-$C_6$ alkyl)₂, —NO₂, —S(=O)₂Rᵃ, $C_1$-$C_4$ alkyl, $C_1$-$C_4$ alkoxy and halogen; and wherein
Rᵃ is selected from the group consisting of OH, —NH₂, —NH($C_1$-$C_6$ alkyl), —N($C_1$-$C_6$ alkyl)₂, $C_1$-$C_4$ alkyl, $C_1$-$C_4$ alkoxy, aryl and heteroaryl, where aryl and hetaryl are unsubstituted or substituted by 1, 2, 3 or 4 radicals selected from the group consisting of $C_1$-$C_4$ alkyl, $C_1$-$C_4$ alkoxy and halogen.

A second aspect of the present invention relates to polymer compositions which are obtained by neutralizing a polymer P3 which is a polymer having at least 0.5 mol-%, in particular at least 1 mol-% and especially at least 5 mol-%, e.g. 0.5 to 100 mol-% or from 0.5 to 99%, in particular from 1 to 90 mol-% or from 1 to 70 mol-% and especially from 5 to 60 mol-%, based on the total amount of repeating units in the polymer P3, of repeating units of polymerized monoethylenically unsaturated mono- or dicarboxylic acid, in particular polymerized maleic or fumaric acid with a polymer of formula II (II)

where Z, A, Q, k, n, R¹ and R², are as defined herein for formulae Ia and X.

The comb polymers P as well as the polymer compositions of the neutralized polymer P3 of the present invention act as a dispersant or wetting agent for fine particulate solid materials, such as organic and inorganic pigments and fillers, in particular as dispersants in liquid dispersions of said solid fine particulate material, such as i.e. they stabilize the solid particles of the solid fine particulate material in a liquid composition of the solid fine particulate material. Stabilization means that the dispersant separates the solid particles and prevents them from coagulation or clumping and settling from the liquid composition. These benefits can be achieved by the comb polymers P and the polymer compositions even at high solids content, e.g. at concentrations of the solid particulate material 30% by weight or more, based on the total weight of the liquid compositions. Moreover, the comb polymers P as well as the polymer compositions of the neutralized polymer P3 also enhance its rheology which is normally difficult to achieve at high solids content. The comb polymers P as well as the polymer compositions according to the present invention also improve the gloss of a coating which is obtained when the liquid composition containing the comb polymer P or the polymer composition of the neutralized polymer P3 and a solid particulate material is coated to a substrate.

Without being bound to theory, it is believed that the beneficial effects are based on the following mechanisms: The anthranilate/anthranilamide moieties in formulae X and II have affinity to the surface of the solid particles thereby provide a strong physical binding of the dispersant to the solid particles. The polymer part, on the other hand, can interact with the liquid dispersant phase to build up a steric environment to stabilize pigment/filler dispersions.

Therefore, a third aspect of the present invention relates to the use of the comb polymer P as defined herein as a dispersing or wetting agent for fine particular solids, such as pigments or fillers in liquid compositions, such as coating compositions, inks, millbase and the like.

A fourth aspect of the present invention relates to the use of a polymer composition of a polymer P3 which has been neutralized with the polymer of formula II as defined herein as a dispersing or wetting agent for fine particular solids, such as pigments or fillers in liquid compositions, such as coating compositions, inks, millbase and the like.

The comb polymers P and the polymer compositions of the neutralized polymer P3 of the present invention are especially useful as dispersant in liquid coating compositions containing solid fine particles, such as organic or inorganic pigments and fillers, in particular coating compositions which, besides the comb polymer P or the polymer composition, contain a conventional polymer binder.

The present invention thus also relates to liquid compositions in the form of a dispersion which comprise a fine particulate solid material, selected from the group consisting of pigments and fillers, a liquid diluent, wherein the fine particulate solid material is dispersed in the liquid diluent, further comprising a comb polymer or a polymer composition as defined herein and in the claims. The present invention relates to liquid compositions in the form of coating compositions, millbase and inks.

The present invention also relates to liquid coating compositions which comprise a fine particulate solid material, selected from the group consisting of pigments and fillers, a liquid diluent, wherein the fine particulate solid material is dispersed in the liquid diluent, further comprising a comb polymer P or a polymer composition as defined herein and in the claims and optionally a polymer binder.

DETAILED DESCRIPTION OF INVENTION

Here and in the following, generic terms, such as alkyl, cycloalkyl, alkylene or halogen for the variables defining the formula I are used. These variables have to be understood as a list of individual radicals which are representatives of the generic term.

In this context, the term $C_n$-$C_m$ indicates the possible number of carbon atoms which the individual members of the generic terms may have.

In this context, the term "halogen" has to be understood as a halogen radical which is generally selected from fluorine, chlorine, bromine or iodine, in particular from fluorine or chlorine.

The term "Alkyl" as used herein and the alkyl parts of —NH($C_1$-$C_6$ alkyl) and —N($C_1$-$C_6$ alkyl)$_2$ in each case denote a saturated hydrocarbon radical which may be linear or branched and which generally has from 1 to 6 carbon atoms ($C_1$-$C_6$ alkyl) and which preferably has from 1 to 4 carbon atoms ($C_1$-$C_4$ alkyl). Examples of $C_1$-$C_4$-alkyl are methyl, ethyl, n-propyl, iso-propyl, n-butyl, 2-butyl(sec-butyl), isobutyl and tert-butyl. Examples for $C_1$-$C_6$-alkyl are, apart those mentioned for $C_1$-$C_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Examples for $C_1$-$C_{20}$-alkyl are, apart those mentioned for $C_1$-$C_6$-alkyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, n-octyl, 1-methyloctyl, 2-methylheptyl, 1-ethylhexyl, 2-ethylhexyl, 1,2-dimethylhexyl, 1-propylpentyl, 2-propylpentyl, nonyl, decyl, 2-propylheptyl, 3-propylheptyl, linear undecyl and its branched isomers, lauryl and its branched isomers, linear tridecyl and its branched isomers, myristyl and its branched isomers, palmityl and its branched isomers, stearyl and its branched isomers, and eicosenyl and its branched isomers.

The term "alkylene" (or alkanediyl) as used herein and in —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), in each case denotes an alkyl radical as defined above, wherein one hydrogen atom at any position of the carbon backbone is replaced by one further binding site, thus forming a bivalent moiety. Preferred alkylene has 2 to 6 carbon atoms, in particular 2 to 4 carbon atoms. Preferably, the two binding sites of the bivalent moiety $C_2$-$C_6$ alkylene or $C_2$-$C_4$ alkylene, respectively, are not at the same carbon atom. Examples of alkylene include methylene, 1,2-ethandiyl (=CH$_2$CH$_2$), 1,2-propandiyl (=CH(CH$_3$)CH$_2$), 1,3-propandiyl (=CH$_2$CH$_2$CH$_2$), 1-methyl-1,3-propandiyl (=CH(CH$_3$)CH$_2$CH$_2$), 2-methyl-1,3-propandiyl (=CH$_2$CH(CH$_3$)CH$_2$), 1-methyl-1,2-propandiyl (=C(CH$_3$)$_2$CH$_2$), 1,4-butandiyl (=CH$_2$CH$_2$CH$_2$CH$_2$), 2,2-dimethyl-1,3-propandiyl (=CH$_2$C(CH$_3$)$_2$CH$_2$), etc.

The term "cycloalkyl" as used herein (and in the cycloalkyl moieties of other groups comprising a cycloalkyl group, e.g. cycloalkoxy and cycloalkylalkyl) denotes in each case a mono- or bicyclic cycloaliphatic radical having usually from 3 to 10 carbon atoms ("$C_3$-$C_{10}$-cycloalkyl"), preferably 3 to 8 carbon atoms ("$C_3$-$C_8$-cycloalkyl") or in particular 3 to 6 carbon atoms ("$C_3$-$C_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 or 8 carbon atoms comprise bicyclo[2.1.1]hexyl, bicyclo[2.2.1]heptyl, bicyclo[3.1.1]heptyl, bicyclo[2.2.1]heptyl, bicyclo[2.2.2]octyl and bicyclo[3.2.1]octyl.

The term "alkoxy" as used herein denotes in each case a straight-chain or branched alkyl group usually having from 1 to 4 carbon atoms ("$C_1$-$C_4$-alkoxy") which is bound to the remainder of the molecule via an oxygen atom. $C_1$-$C_2$-Alkoxy is methoxy or ethoxy. $C_1$-$C_4$-Alkoxy is additionally, for example, n-propoxy, 1-methylethoxy(isopropoxy), butoxy, 1-methylpropoxy(sec-butoxy), 2-methylpropoxy (isobutoxy) or 1,1-dimethylethoxy(tert-butoxy).

The term "aryl" as used herein (and the aryl moiety in aryl-$C_1$-$C_4$-alkyl and aryloxy) in each case denotes a mono-, bi- or tricyclic hydrocarbon radical comprising at least one phenyl ring, to which one or two further saturated or unsaturated 5- or 6-membered hydrocarbon rings may be fused. Examples of aryl include phenyl, naphthyl, indanyl, indenyl, 1,2,3,4-tetrahydro-5-naphtyl, 1,2,3,4-tetrahydro-6-naphtyl, anthracenyl, 9,10-dihydroanthracen-1-yl and 9,10-dihydroanthracen-2-yl.

The term "heteroaryl" or "hetaryl" as used herein (and the heteroaryl moiety in hetero-aryl-$C_1$-$C_4$-alkyl) in each case denotes a mono-, bi- or tricyclic heterocyclic radical comprising at least one aromatic 5- or 6-membered heterocyclic radical having 1, 2, 3 or heteroatoms selected from N, O and S as ring members, to which one or two further saturated or unsaturated 5- or 6-membered hydrocarbon rings or heterocyclic rings having 1, 2, 3 or heteroatoms selected from N, O and S as ring members may be fused. Examples of 5- or 6-membered heterocyclic radicals (monocyclic heteroaryl), include furyl, thienyl, pyrrolyl, imidazolyl, pyrazolyl, triazolyl, oxazolyl, thiazolyl, isoxazolyl, isothiazolyl, pyridyl, pyrimidinyl, pyrazinyl, pyridazinyl and triazinyl. Examples of 5- or 6-membered heterocyclic radicals to which one or two further saturated or unsaturated 5- or 6-membered hydrocarbon rings or heterocyclic rings having 1, 2, 3 or heteroatoms selected from N, O and S as ring members are fused (bi and tricyclic heteroaryl), include, quinolinyl, quinazolinyl, quinoxalinyl, benzofuryl, benzothienyl, indolyl, indazolyl, benzimidazoly, benzoxazolyl, benzoisoxazolyl, benzoisothiazolyl etc.

The term "aryl-$C_1$-$C_4$-alkyl" denotes an aryl radical as defined herein which is bound to the remainder via a $C_1$-$C_4$-alkylene moiety as defined herein.

The term "aryloxy" denotes an aryl radical as defined herein which is bound to the remainder via an oxygen atom.

The term "heteroaryl-$C_1$-$C_4$-alkyl" denotes a heteroaryl radical as defined herein which is bound to the remainder via a $C_1$-$C_4$-alkylene moiety as defined herein.

The remarks made below as to preferred embodiments of the variables (substituents) of the moieties of formulae Ia and Ib as well as in formula II are valid on their own as well as preferably in combination with each other. It is clear to a skilled person that for k being 2, 3 or 4, the substituent radical $R^2$ may be identical or different. It is also clear to a skilled person that for n >0 the meanings k, $R^1$ and $R^2$ in each repeating unit may be identical or different, generally, they will be identical.

The remarks made below concerning preferred embodiments of the comb polymers P, the repeating units of formulae Ia and Ib, the polymers P3 and the polymers of the formula II further are valid on their own as well as preferably in combination with each other concerning the comb polymers P, the polymers P3 and the polymer of formula II as well as concerning the uses, compositions and methods according to the invention.

In particular, the variables k, n, A, Q, $R^1$, $R^2$ and $R^a$ in formulae Ia and II alone or in combination have preferably the following meanings:

k is 0, 1 or 2, in particular 0 or 1, especially 0;
n is 0, 1 or 2, in particular 0 or 1, especially 0;
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q, especially a chemical bond or a divalent moiety —C(=O)—O—($C_2$-$C_4$ alkylene), where the alkylene part is attached to Q;
Q is a divalent moiety selected from the group consisting of —O— and —NH;
$R^1$ is selected from the group consisting of hydrogen, $C_1$-$C_4$ alkyl and phenyl, in particular $R^1$ is hydrogen;
$R^2$ if present, is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2R^a$, $C_1$-$C_4$ alkyl, $C_1$-$C_4$ alkoxy, halogen, phenyl and pyridyl, where the last two radicals are unsubstituted or carry a radical selected from halogen, $C_1$-$C_4$ alkyl and $C_1$-$C_4$ alkoxy, in particular $R^2$ is halogen, —OH, —COOH, —COOCH$_3$, —NH$_2$, —NH($C_1$-$C_6$ alkyl), —N($C_1$-$C_6$ alkyl)$_2$, $C_1$-$C_4$ alkyl or $C_1$-$C_4$ alkoxy, especially chlorine, fluorine bromine, methoxy, or methyl;
$R^a$ if present, is selected from the group consisting of hydrogen and $C_1$-$C_4$ alkyl, especially methyl.

In particular the variables k, n, A, Q, $R^1$, $R^2$ and $R^a$ alone or in combination have preferably the following meanings:
k is 0;
n is 0;
A is a chemical bond or a divalent moiety —C(=O)—O— ($C_2$-$C_4$ alkylene), where the alkylene part is attached to Q;
Q is a divalent moiety selected from the group consisting of —O— and —NH;
$R^1$ is hydrogen.

The variable Z in formula X, and likewise in formula II, is preferably selected from the group consisting of alkyl groups having from 10 to 100 carbon atoms, polyesters, polyethers, polyetheresters, polycarbonates and polymers having a C-C-backbone and $C_1$-$C_{20}$-alkoxycarbonyl moieties attached to the C-C-backbone.

The term "aliphatic polyether" is understood as a polyether, where the majority of the carbon atoms in the repeating units, in particular at least 90% of the carbon atoms of the repeating units in the polymer backbone, are present as alkylene units, e.g. $C_2$-$C_{10}$ alkylene units, in particular $C_2$-$C_4$ alkylene units, which are linked by oxygen atoms, where the alkylene units may carry a hydroxyl group. In particular, the polymer back-bone of aliphatic polyethers does not contain aromatic rings, such as phenyl.

The term "aliphatic polyesters" is understood as a polyester, where the majority of the carbon atoms in the repeating units, in particular at least 90% of the carbon atoms of the repeating units in the polymer backbone are present as alkylene units and carbonyl groups, in particular $C_2$-$C_{10}$ alkylene units and carbonyl groups, where the alkylene units may carry a hydroxyl group. In particular, the polymer backbone of aliphatic polyesters does not contain aromatic rings, such as phenyl.

The term "aliphatic polyetheresters" is understood as a block polyether-co-polyester having both at least one, e.g. 1, 2, 3 or 4 polyether block(s) and at least one, e.g. 1, 2, 3 or 4 polyester block(s). The weight ratio of the polyester blocks and the polyether blocks is usually in the range from 1:100 to 100:1, in particular in the range from 1:10 to 10:1. The majority of the carbon atoms in the polyester blocks, in particular at least 90% of the carbon atoms of the repeating units in the polyester blocks are present as alkylene units and carbonyl groups, in particular $C_2$-$C_6$ alkylene units and carbonyl groups, while the carbon atoms in the polyether blocks are present as alkylene units, in particular $C_2$-$C_6$ alkylene units or $C_2$-$C_3$ alkylene units. The alkylene units in both the aliphatic polyester blocks and the polyester blocs of the aliphatic polyetheresters may carry a hydroxyl group. In particular, the polymer backbone of aliphatic polyetheresters does not contain aromatic rings, such as phenyl. A particular embodiment of aliphatic polyetheresters has exactly one polyether block and exactly one polyester block.

The term "aliphatic polycarbonates" is understood as a polycarbonate, where the majority of the carbon atoms in the repeating units, in particular at least 90% of the carbon atoms of the repeating units in the polymer backbone, are present as alkylene units and carbonyl groups, in particular $C_2$-$C_6$ alkylene units and carbonyl groups, where the alkylene units may carry a hydroxyl group. In particular, the polymer backbone of aliphatic polyesters does not contain aromatic rings, such as phenyl.

"Polymers having a C-C-backbone and $C_1$-$C_{20}$-alkoxycarbonyl moieties attached to the C-C-backbone" is understood as a polymer obtained by (co)polymerization, in particular radical (co)polymer of monoethylenically unsaturated monomers, where the monoethylenically unsaturated monomers comprise at least one $C_1$-$C_{20}$-alkyl ester of monoethylenically unsaturated $C_3$-$C_6$-monocarboxylic acids.

With regard to their capability of acting as a dispersant, in particular as a dispersant for pigments and fillers, preference is given to polymer segments Z which are derived from polymers having a number average molecular weight $M_N$ in the range from 200 to 50000 Dalton, in particular from 300 to 20000 Dalton, especially from 400 to 10000 Dalton. The weight average molecular weight $M_W$ of the polymer segments Z is generally in the range from 210 to 200000 Dalton, in particular from 330 to 50000 Dalton, especially from 500 to 20000 Dalton. The polydispersity $M_W/M_N$ is generally in the range from 1.05 to 4, preferably from 1.1 to 3 and especially from 1.2 to 2.

In a particular embodiment of the invention the variable Z in formula X and likewise in formula II is a polymer segment of an aliphatic polyether, e.g. a poly-($C_2$-$C_{10}$-alkylene oxide), in particular a poly-($C_2$-$C_4$-alkylene oxide), especially a poly(ethylene oxide), a poly(propylene oxide) or a poly(ethylene oxide-co-propylene oxide), where in the latter the ethylene oxide and propylene oxide repeating units may be arranged randomly or blockwise. In the moiety of the formula X and likewise in formula II the group A is preferably attached to one of the termini of the aliphatic polyether. In this embodiment, the variable A is preferably a single bond. Q is preferably O or NH. The aliphatic polyethers may be linear or branched. The aliphatic polyether, e.g. the poly-($C_2$-$C_{10}$-alkylene oxide), may have a terminal OH group or may be endcapped, i.e. it has a terminal group located at a distal position to Q which terminal group may be an alkyl group, in particular an alkyl group having from 1 to 24 carbon atoms, an aryl group, such as phenyl or naphthyl, an arylalkyl group, such as benzyl or an alkyl substituted aryl group, e.g. a phenyl group, which carries 1 or 2 alkyl groups having 1 to 24 carbon atoms.

In another particular embodiment of the invention the variable Z in formula X and likewise in formula II is a polymer segment of an aliphatic polyester which is in particular selected from
a) aliphatic polyesters, where the majority, in particular at least 70% of repeating units are units of the polyester backbone are derived from aliphatic $C_2$-$C_{10}$ dicarboxylic acids and $C_2$-$C_{10}$ aliphatic diols and optionally $C_3$-$C_{10}$ aliphatic or $C_5$-$C_{10}$-cycloaliphatic polyols having 3, 4, 5 or 6 hydroxyl groups; and
b) aliphatic polyesters, where the majority, in particular at least 70% of repeating units of the polyester backbone are derived from one or more, e.g. 1, 2 or 3 aliphatic $C_4$-$C_{10}$ lactones, or a combination of one or more, e.g. 1, 2 or 3 aliphatic $C_4$-$C_{10}$ lactones with at least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups.

In another particular embodiment of the invention the variable Z in formula X and like-wise in formula II is a polymer segment of an aliphatic polyetherester which is in particular selected from
a) aliphatic polyetheresters, where the majority, in particular at least 70% of repeating units are units of the polyester blocks are derived from aliphatic $C_2$-$C_{10}$ dicarboxylic acids and $C_2$-$C_{10}$ aliphatic diols and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise; and
b) aliphatic polyetheresters, where the majority, in particular at least 70% of repeating units are units of the polyester blocks are derived from one or more, e.g. 1, 2, or 3 aliphatic $C_4$-$C_{10}$ lactones, or a combination thereof with one or more, e.g. 1, 2 or 3 further components, selected from $C_2$-$C_{10}$ dicarboxylic acids, $C_2$-$C_{10}$ aliphatic diols, and $C_3$-$C_{10}$ aliphatic or $C_2$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

The weight ratio of the polyester blocks and the polyether blocks in the aliphatic polyetherester is usually in the range from 1:100 to 100:1 in particular in the range from 1:10 to 10:1.

With regard to the aliphatic polyesters and polyetheresters, examples of aliphatic $C_2$-$C_{10}$ dicarboxylic acids include malonic acid, succinic acid, glutaric acid, 2-methylglutaric acid, 3-methylglutaric acid, adipic acid, pimelic acid, azelaic acid, sebacic acid, 2,2-dimethylglutaric acid, suberic acid and diglycolic acid.

Examples of $C_2$-$C_{10}$ aliphatic diols include ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, diethylene glycol and triethylene glycol.

Examples of $C_3$-$C_{10}$ aliphatic or $C_5$-$C_{10}$-cycloaliphatic polyols having 3, 4, 5 or 6 hydroxyl groups include glycerol, trimethylolpropane, trimethylolethane, pentaerythritol, sorbitol, innositol, pentahydroxycyclopentane, hexahydroxycyclohexane, etc.

Examples of $C_4$-$C_{10}$ lactones include γ-butyrolactone, γ-valerolactone, δ-valerolactone, ε-caprolactone.

In the moiety of the formula X and likewise in formula II the group A is preferably attached to one of the termini of the aliphatic polyester or polyether ester. In these embodiments, the variable A is preferably a single bond. Q is preferably O or NH.

A particular preferred embodiment of the invention relates to comb polymers P, where the Z in formulae X and II is an aliphatic polyester, where the majority, in particular at least 70% of repeating units are units of the polyester backbone are derived from aliphatic $C_4$-$C_{10}$ lactones, in particular from γ-valerolactone, δ-valerolactone, ε-caprolactone or a mixture thereof.

A further particular preferred embodiment of the invention relates to comb polymers P, where the Z in formulae X and II is an aliphatic polyetherester, where in the at least one polyester block the majority, in particular at least 70% of repeating units are units of the polyester block are derived from aliphatic $C_4$-$C_{10}$ lactones, in particular from γ-valerolactone, δ-valerolactone, ε-caprolactone or a mixture thereof and where the at least one aliphatic polyether block is as defined above, and where the polyether blocks are preferably poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise. The weight ratio of the polyester blocks and the polyether blocks of the polyetheresters of this particular embodiment is usually in the range from 1:100 to 100:1, in particular in the range from 1:10 to 10:1.

In yet a further particular embodiment of the invention the variable Z in formula X and likewise in formula II is a polymer segment of an aliphatic polycarbonate, in particular a linear or branched aliphatic polycarbonate having a polymer backbone which is a poly-($C_2$-$C_4$-alkylene carbonate), especially a poly(ethylene carbonate), a poly(propylene carbonate) or a poly(ethylene oxide-co-propylene carbonate), where in the latter the ethylene carbonate and propylene carbonate repeating units may be arranged randomly or blockwise. In the moiety of the formula X and likewise in formula II the group A is preferably attached to one of the termini of the aliphatic polycarbonate. In these embodiments, the variable A is preferably a single bond. Q is preferably O or NH.

In yet a further particular embodiment of the invention the variable Z in formula X and likewise in formula II is a polymer segment of a polymer having a C-C-backbone and $C_1$-$C_{20}$-alkoxycarbonyl moieties attached to the C-C-backbone, in particular a polymer segment of a polymer having a C-C-backbone and comprising repeating units of polymerized monomers M1, selected from $C_1$-$C_{20}$-alkyl esters of monoethylenically unsaturated $C_3$-$C_6$-monocarboxylic acids, in particular from polymerized $C_1$-$C_{20}$-alkyl (meth)acrylates.

The term "$C_1$-$C_{20}$-alkyl (meth)acrylates" as used herein refers to both the $C_1$-$C_{20}$-alkylesters of acrylic acid and to the $C_1$-$C_{20}$-alkylesters of methacrylic acid.

The repeating units of polymerized monomers M1 will generally amount to at least 30 mol-%, in particular at least 50 mol-% or at least 70 mol-% of the repeating units in the polymer having a C-C-backbone. In addition to the repeating units of monomers M1, the polymer having a C-C-backbone may comprise further repeating units of polymerized monomers different from monomers M1. The amount of these polymerized monomers in the polymer segment will generally not exceed 70 mol-%, in particular 50 mol-% or 30 mol-% of the repeating units in the polymer having a C-C-backbone.

Suitable monomers different from monomers M1 are monoethylenically unsaturated monomers including neutral non-functional monoethylenically unsaturated monomers M1a selected from the group consisting of di-($C_1$-$C_{10}$-alkyl) esters of monoethylenically unsaturated $C_4$-$C_6$-dicarboxylic acids, $C_5$-$C_{10}$-cycloalkyl esters of monoethylenically unsaturated $C_3$-$C_6$-monocarboxylic acids, di-($C_5$-$C_{10}$-cycloalkyl) esters of monoethylenically unsaturated $C_4$-$C_6$-dicarboxylic acids, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with monoethylenically unsaturated $C_3$-$C_6$-monocarboxylic acids and monovinylaromatic hydrocarbon compounds (vinylaromatic hydrocarbons);

neutral and basic functional monoethylenically unsaturated monomers M2 which in addition to the polymerizable C=C-double bond include at least one neutral or basic functional group selected from a hydroxyl group, primary or secondary amino group, a carboxamide group and a nitrile group;

acidic functional monoethylenically unsaturated monomers M3 which in addition to the polymerizable C=C-double bond include at least one acidic functional group selected from carboxyl and hydroxysulfonyl group.

The esters of mono-$C_1$-$C_{10}$-alkyl-terminated poly-$C_2$-$C_4$-alkyleneglycols, in particular the esters of mono-$C_1$-$C_{10}$-alkyl-terminated polyethyleneglycols, with a monoethylenically unsaturated $C_3$-$C_6$-monocarboxylic acid, in particular with acrylic acid or methacrylic acid, usually have a molecular weight (number average) in the range from 200 to 5000 Dalton, depending on the number of $C_2$-$C_4$-alkyleneoxide repeating units.

Examples of $C_3$-$C_6$-monocarboxylic acids are acrylic acid and methacrylic acid. Examples of $C_4$-$C_6$-dicarboxylic acids are maleinic acid, fumaric acid, itaconic acid or citraconic acid. Hence, monomers M1 are in particular the aforementioned esters of acrylic acid, methacrylic acid, maleinic acid, fumaric acid, itaconic acid or citraconic acid. Examples of suitable esters M1a of acrylic acid and methacrylic acid are isobornyl acrylate, isobornyl methacrylate, cyclohexyl acrylate, cyclohexyl methacrylate, methylpolyethylenglycol acrylate and methylpolyethyleneglycol methacrylate.

Examples of vinylaromatic hydrocarbons M1a include styrene, vinyltoluene and α-methyl styrene, with particular preference given to styrene.

Preferred monomers M1a are selected from vinylaromatic hydrocarbons, in particular styrene.

Examples of suitable monomers M2 include hydroxy-$C_2$-$C_4$-alkyl esters of $C_3$-$C_6$-monocarboxylic acids, in particular hydroxy-$C_2$-$C_4$-alkyl esters of acrylic acid or methacrylic acid, such as 2-hydroxyethyl acrylate, 2-hydroxyethyl methacrylate, 2- or 3-hydroxypropyl acrylate, 2- or 3-hydroxypropyl methacrylate, 4-hydroxybutyl acrylate and 4-hydroxybutyl methacrylate;

N-(hydroxy-$C_2$-$C_4$-alkyl)amides of $C_3$-$C_6$-monocarboxylic acids, in particular N-(hydroxy-$C_2$-$C_4$-alkyl) amides of acrylic acid or methacrylic acid, such as N-(2-hydroxyethyl) acrylamide, N-(2-hydroxyethyl) methacrylamide, N-(2- or 3-hydroxypropyl) acrylamide, N-(2- or 3-hydroxypropyl) methacrylamide, N-(4-hydroxybutyl) acrylamide and N-(4-hydroxybutyl) methacrylamide;

amino-$C_2$-$C_4$-alkyl esters of $C_3$-$C_6$-monocarboxylic acids, in particular amino-$C_2$-$C_4$-alkyl esters of acrylic acid or methacrylic acid, such as 2-aminoyethyl acrylate, 2-aminoethyl methacrylate, 2- or 3-aminopropyl acrylate, 2- or 3-aminopropyl methacrylate, 4-aminobutyl acrylate and 4-aminobutyl methacrylate;

N-(amino-$C_2$-$C_4$-alkyl)amides of $C_3$-$C_6$-monocarboxylic acids, in particular N-(amino-$C_2$-$C_4$-alkyl)amides of acrylic acid or methacrylic acid, such as N-(2-aminoethyl) acrylamide, N-(2-aminoethyl) methacrylamide, N-(2- or 3-aminopropyl) acrylamide, N-(2- or 3-aminopropyl) methacrylamide, N-(4-aminobutyl) acrylamide and N-(4-aminobutyl) methacrylamide;

primary amides of $C_3$-$C_6$-monocarboxylic acids, such as acrylamide and methacrylamide;

monoethylenically unsaturated $C_3$-$C_6$-mononitriles, such as acrylonitrile, methacrylonitrile;

Preferably, the amount of repeating units derived from monomers M2 do not exceed 20 mol-% based on the total repeating units in the polymer having a C-C-backbone.

Examples of suitable monomers M3 include:

$C_3$-$C_6$-monocarboxylic acids, such as acrylic acid and methacrylic acid;

$C_4$-$C_6$-dicarboxylic acids, such as maleinic acid, fumaric acid, itaconic acid or citraconic acid monoethylenically unsaturated sulfonic acids, such as vinylsulfonic acid, allyl-sulfonic acid, methallylsulfonic acid, styrenesulfonic acid.

Preferably, the amount of repeating units derived from monomers M3 do not exceed 20 mol-% based on the total repeating units in the polymer having a C-C-backbone.

In particular, the total amount of repeating units derived from monomers M2 and M3 do not exceed 20 mol-% based on the total amount of repeating units in the polymer having a C-C-backbone.

Particularly preferred embodiments of the invention relate to comb polymers P, where the Z in formulae X and II is a polymer having a C-C backbone which comprise at least 50 mol-%, in particular at least 70 mol-%, based on the total amount of repeating units in the polymer having a C-C-backbone, of repeating units derived from monomers M1 which are selected from $C_1$-$C_{10}$-alkyl (meth)acrylates, at most 40 mol-%, in particular at most 30 mol-% of repeating units, derived from monomers M1a and not more than 20 mol-%, in particular not more than 10 mol-% of repeating units derived from monomers M2 and M3.

Besides the repeating units A, i.e. repeating units of the formulae Ia and/or Ib, the comb polymers may also comprise repeating units B which are different from the repeating units A and which are derived from the group of neutral non-functional monoethylenically unsaturated monomers, in particular from the following monomers:

- $C_1$-$C_{20}$-alkyl esters of monoethylenically unsaturated $C_3$-$C_6$-monocarboxylic acids, in particular $C_1$-$C_{20}$-alkyl and $C_3$-$C_{10}$-cycloalkyl esters of acrylic acid, $C_1$-$C_{20}$-alkyl and $C_3$-$C_{10}$-cycloalkyl esters of methacrylic acid, such as methyl acrylate, ethyl acrylate, n-propylacrylate, n-butyl acrylate, iso-butyl acrylate, tert-butyl acrylate, methyl methacrylate, ethyl methacrylate, propyl methacrylate, iso-butyl methacrylate, n-butyl methacrylate, tert.-butyl methacrylate, hexyl acrylate, hexyl methacrylate, octyl acrylate, octyl methacrylate, 2-ethylhexyl acrylate, 2-ethylhexyl methacrylate, decyl acrylate, decyl methacrylate, 2-propylheptyl acrylate, 2-propylheptyl methacrylate, isobornyl acrylate, isobornyl methacrylate, cyclohexyl acrylate or cyclohexyl methacrylate;
- di-($C_1$-$C_{10}$-alkyl) esters of monoethylenically unsaturated $C_4$-$C_6$-dicarboxylic acids and di-($C_3$-$C_{10}$-cycloalkyl) esters of $C_4$-$C_6$-dicarboxylic acids, in particular the di-($C_1$-$C_{10}$-alkyl) esters of itaconic acid and the di-($C_3$-$C_{10}$-cycloalkyl) esters of itaconic acid, such as the dimethyl ester, diethyl ester or dibutyl ester of itaconic acid;
- monovinylaromatic hydrocarbon compounds (vinylaromatic hydrocarbons), such as styrene, vinyltoluene and α-methyl styrene, with particular preference given to styrene;
- $C_4$-$C_{18}$-olefins, such as 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;
- $C_1$-$C_{20}$-alkylvinyl ethers, such as ethylvinyl ether, butylvinyl ether hexylvinyl ether, octylvinyl ether, decylvinyl ether, dodecylvinyl ether, stearylvinyl ether;
- vinyl esters of $C_1$-$C_{20}$-alkanoic acids, in particular vinyl acetate, vinyl propionate vinyl butyrate, vinyl stearate.

Preferably, the repeating units B are derived from at least one polymerized monoethylenically unsaturated monomer selected from the group consisting of
- monovinylaromatic monomers, especially styrene;
- $C_4$-$C_{18}$-olefins, especially 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;
- $C_1$-$C_{20}$-alkylvinyl ethers;
- vinyl esters of $C_1$-$C_{20}$-alkanoic acids;
- $C_1$-$C_{20}$-alkyl and $C_3$-$C_{10}$-cycloalkyl esters of acrylic acid;
- $C_1$-$C_{20}$-alkyl and $C_3$-$C_{10}$-cycloalkyl esters of methacrylic acid, and
- di-$C_1$-$C_{20}$-alkyl and di-$C_3$-$C_{10}$-cycloalkyl esters of itaconic acid;

and mixtures of these monomers.

Especially the repeating units B are derived from at least one polymerized monoethylenically unsaturated monomer selected from the group consisting of
- monovinylaromatic monomers, especially styrene, and
- $C_4$-$C_{18}$-olefins, especially 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms, and mixtures of these monomers.

The amount of repeating units derived form monomers B may be 0 mol-%, but will be frequently at least 1 mol-%, in particular at least 10 mol-%, more particularly at least 30 mol-% and especially at least 40 mol-%, e.g. from 0 to 99.5 mol-% or from 1 to 99.5 mol-% or from 1 to 99 mol-%, in particular from 10 to 99 mol-% or from 30 to 99 mol-% or from 30 to 98 mol-% and especially from 40 to 95 mol-% or from 40 to 90 mol, based on the total number of repeating units in the comb polymer P.

Besides the repeating units A, i.e. repeating units of the formulae Ia and/or Ib, and the optionally present repeating units B, the comb polymers may also comprise repeating units C which are different from the repeating units A and B. These repeating units C are preferably selected from repeating units of the following formulae C-1, C-2, C-3, C-4 and C-5 and mixtures thereof:

(C-1)

(C-2)

(C-3)

(C-4)

(C-5)

where
$R^3$, $R^8$ independently of each other are hydrogen or a monovalent hydrocarbon radical having from 1 to 24 carbon atoms such as alkyl having 1 to 24 carbon atoms, cycloalkyl having 6 to 12 carbon atoms, substituted or unsubstituted aryl, e.g. phenyl, and substituted or unsubstituted aryl-$C_1$-$C_4$-alkyl, such as benzyl or phenethyl;

$R^4$ is a bivalent alkandiyl radical having from 2 to 24 carbon atoms, such as 1,2-ethandiyl, 1,2-propandiyl, 1,4-butandiyl or 1,6-hexandiyl;

$R^5$, $R^6$, $R^7$ are identical or different and selected from the group consisting of alkyl having 1 to 15 carbon atoms, cycloalkyl having 6 to 12 carbon atoms, substituted or unsubstituted aryl, such as phenyl, and substituted or unsubstituted aryl-$C_1$-$C_4$-alkyl, such as benzyl or phenethyl, where one of $R^5$, $R^6$, $R^7$ may also be hydrogen, and $R^9$ is a bivalent radical selected from alkandiyl radical having from 2 to 24 carbon atoms, such as 1,2-ethandiyl, 1,2-propandiyl, 1,4-butandiyl or 1,6-hexandiyl, and O-alkandiyl having from 2 to 24 carbon atoms, e.g. O—$CH_2CH_2$, O—$CH(CH_3)CH_2$, O—$CH_2CH(CH_3)$, $O(CH_2)_4$ or $O(CH_2)_6$, where the oxygen atom is bound to the phosphor atom.

In particular, the variables $R^3$ to $R^9$ in formulae C-2 to C-5 alone or in combination have preferably the following meanings:

$R^3$, $R^8$ independently of each other are hydrogen or alkyl having from 1 to 4 carbon atoms;

$R^4$ is a bivalent alkandiyl radical having from 2 to 6 carbon atoms;

$R^5$, $R^7$ are identical or different and selected from the group consisting of alkyl having 1 to 4 carbon atoms;

$R^6$ is hydrogen, alkyl having 1 to 4 carbon atoms or aryl-$C_1$-$C_4$-alkyl, and $R^9$ is a bivalent radical selected from alkandiyl radical having from 2 to 6 carbon atoms and O-alkandiyl having from 2 to 6 carbon atoms, where the oxygen atom is bound to the phosphor atom.

Especially, the variables $R^3$ to $R^9$ in formulae C-2 to C-5 alone or in combination have preferably the following meanings:

$R^3$, $R^8$ are hydrogen;

$R^4$ is a bivalent alkandiyl radical having from 2 to 6 carbon atoms, such as 1,2-ethandiyl, 1,2-propandiyl, 1,4-butandiyl or 1,6-hexandiyl;

$R^5$, $R^7$ are identical or different and selected from the group consisting of alkyl having 1 to 4 carbon atoms;

$R^6$ is hydrogen, alkyl having 1 to 4 carbon atoms or benzyl, and $R^9$ is O-alkandiyl having from 2 to 6 carbon atoms, such as O—$CH_2CH_2$, O—$CH(CH_3)CH_2$, O—$CH_2CH(CH_3)$, $O(CH_2)_4$, or $O(CH_2)_6$, where the oxygen atom is bound to the phosphor atom.

The amount of repeating units C will generally not exceed 50 mol-%, in particular 40 mol-%, especially 30 mol-%, based on the total number of repeating units in the comb polymer P. If present, the amount of repeating units C will be least 0.5 mol-%, in particular at least 1 mol-%, especially at least 5 mol-%, e.g. 0.5 to 50 mol-%, in particular from 1 to 40 mol-% and especially from 5 to 30 mol-%, based on the total number of repeating units in the comb polymer P. Preferably, the total amount of repeating units A and C will be from 1 to 90 mol-%, in particular from 2 to 70 mol-% and especially from 10 to 60 mol-%, -%, based on the total number of repeating units in the comb polymer P.

With regard to their capability of acting as a dispersant, in particular as a dispersant for pigments and fillers, preference is given to comb polymers P which have a number average molecular weight $M_N$ in the range from 1000 to 200000 Dalton, in particular from 1500 to 150000 Dalton, especially from 1800 to 100000 Dalton. The weight average molecular weight $M_W$ of the comb polymers P is generally in the range from 1100 to 1000000 Dalton, in particular from 1700 to 600000 Dalton, especially from 2000 to 300000 Dalton. The polydispersity $M_W/M_N$ is generally in the range from 1.05 to 5, preferably from 1.1 to 4 and especially from 1.2 to 3.

The comb polymers P can be prepared by analogy to standard procedures in the field of polymer chemistry, e.g. either by homo or copolymerizing monomers A' which yield repeating units A, optionally together with co-monomers that yield repeating units B and/or C, or by polymer analogous reactions, the latter being preferred.

Preferably, the comb polymers P are prepared by reacting a polymer P1 having at least 0.5 mol-%, in particular at least 1 mol-% or 2 mol-%, especially at least 5 mol-% or 10 mol-%, e.g. 0.5 to 90 mol-% or 1 to 90 mol-%, in particular from 1 to 70 mol-% or 2 to 70 mol-%, and especially from 5 to 60 mol-% or 10 to 60 mol-%, based on the total amount of repeating units in the polymer P1, of repeating units of polymerized maleic anhydride with a polymer of formula II as defined above.

Besides the repeating units of polymerized maleic, the polymers P1 may also comprise repeating units B which are derived from the group of neutral non-functional monoethylenically unsaturated monomers, in particular from the monomers B as defined above in context with repeating units B of the comb polymer P.

Preferably, the repeating units B in the copolymer P1 are derived from at least one polymerized monoethylenically unsaturated monomer selected from the group consisting of
monovinylaromatic monomers, especially styrene;
$C_4$-$C_{18}$-olefins, especially 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;
$C_1$-$C_{20}$-alkylvinyl ethers;
vinyl esters of $C_1$-$C_{20}$-alkanoic acids;
$C_1$-$C_{20}$-alkyl and $C_3$-$C_{10}$-cycloalkyl esters of acrylic acid;
$C_1$-$C_{20}$-alkyl and $C_3$-$C_{10}$-cycloalkyl esters of methacrylic acid, and
di-$C_1$-$C_{20}$-alkyl and di-$C_3$-$C_{10}$-cycloalkyl esters of itaconic acid;
and mixtures of these monomers.

Especially, the repeating units B in the copolymer P1 are derived from at least one polymerized monoethylenically unsaturated monomer selected from the group consisting of
monovinylaromatic monomers, especially styrene, and
$C_4$-$C_{18}$-olefins, especially 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;
and mixtures of these monomers.

The amount of repeating units derived form monomers B may be 0 mol-%, but will be frequently at least 10 mol-%, in particular at least 30 mol-%, especially at least 40 mol-%, e.g. from 0 to 99.5 mol-% or from 10 to 99.5 mol-%, preferably from 30 to 99 mol-% or from 30 to 98 mol-%, in particular from 40 to 95 mol-% or from 40 to 90 mol-%, based on the total number of repeating units in the polymer P1.

A very preferred embodiment relates to polymers P1 which are SMA type copolymers, i.e. copolymers of styrene and maleic anhydride, in particular a SMA type copolymer comprising 1 to 70 mol-%, in particular 10 to 60 mol-% of polymerized maleic anhydride and from 30 to 99 mol-%, in particular from 40 to 90 mol-% of styrene, based on the total amount of monomers forming the polymer P1.

Preference is given to polymers P1 which have a number average molecular weight $M_N$ in the range from 500 to 50000 Dalton, in particular from 750 to 40000 Dalton, especially from 900 to 20000 Dalton. The weight average molecular weight $M_W$ of the polymers P1 is generally in the range from 550 to 200000 Dalton, in particular from 850 to 100000 Dalton, especially from 1000 to 60000 Dalton. The polydispersity $P=M_W/M_N$ is generally in the range from 1.05 to 10, preferably from 1.1 to 8 and especially from 1.2 to 5.

Copolymers P1 are principally known in the art, e.g. from the references cited in the introductory part of the present application, e.g. from WO 2007/039603 or WO 2008/080580. Apart from that, copolymers P1 are commercially available, e.g. copolymers of styrene and maleic anhydride can be obtained as SMA resins, e.g. SM! 1000, SMA 2000, SMA 3000, SMA EF30, SMA EF40, SMA EF60 or SMA EF80 of Cray Valley (France).

Preferably, the polymer P1 is reacted with the polymer of formula II in an amount that is sufficient to achieve the desired amount of repeating units A of the formulae Ia and/or Ib. Depending on the reaction conditions, either repeating units of the formulae Ia or Ib or both repeating units will form. Of course, repeating units of the formula Ib will only form, if $R^1$ in the polymer of formula II is hydrogen.

Principally, the relative amounts of polymers P1 and II may be chosen, such that the amount of polymer of formula II is at least 0.5 mol-%, in particular at least 1 mol-% or at least 5 mol-% and especially at least 10 mol-% or at least 20 mol-% or at least 50 mol-%, based on the amount of polymerized maleic anhydride units in the polymer P1. Preferably, the amount of polymer of formula II does not exceed 200 mol-%, in particular 100 mol-% or 80 mol-% or 60 mol-%, based on the amount of polymerized maleic anhydride units in the polymer P1. In particular, the amount of polymer of formula II is from 0.5 to 200 mol-%, in particular from 1 to 100 mol-% especially from 5 to 80 mol-% or form 10 to 80 mol-% or from 20 to 80 mol-% or from 5 to 60 mol-% or from 10 to 60 mol-% or from 20 to 60 mol-%, based on the amount of polymerized maleic anhydride units in the polymer P1.

The reaction of the polymer of formula II with the polymer P1 may be performed by mixing the polymer P1 with the polymer of formula II, optionally in a suitable solvent, in particular in an aprotic solvent, such as esters, in particular $C_1$-$C_6$-alkyl esters or $C_1$-$C_3$-alkoxy-$C_1$-$C_4$-alkyl esters of $C_1$-$C_4$-alkanoic acids, in particular esters of acetic or propionic acid, such as ethyl acetate, methoxyethyl acetate, methoxypropyl acetate, butyl acetate, or ethyl propionate, hydrocarbons, in particular aromatics, such as toluene, xylenes, and mixtures thereof. Preferably, the reaction is performed in a solvent, preferably at concentrations of the reactants of 10 to 90% by weight, in particular 20 to 80% by weight, based on the reaction mixture. The reaction may also be performed in bulk i.e. the concentration of the reactants is at least 90% by weight, based on the weight of the reaction mixture.

The temperatures for achieving the reaction of the polymer P1 with the polymer of formula II is generally in the range from 40 to 200° C., in particular from 50 to 170° C.

In a preferred embodiment of the invention, only a part of the polymerized maleic anhydride groups in the polymer P1 are converted into repeating units A, e.g. from 1 to 90 mol-%, in particular from 10 to 80 mol-% especially from 20 to 75 mol-% or from 50 to 75 mol-%, based on the amount of polymerized maleic anhydride units in the polymer P1. The remainder of the unreacted repeating units may then be subjected to further reactions in order to yield the repeating units of the formulae $C_1$ to $C_5$ or a combination thereof.

Thus, in a particular embodiment of the invention a comb polymer P2 is prepared by reaction of polymer P1 and the polymer of formula II which still has polymerized units of maleic acid which are then further reacted to yield comb polymers P1 which have at least one of the repeating units for formulae C-1 to C-5 or a combination thereof. Suitable reactions to yield comb polymers P which have at least one of the repeating units for formulae C-1 to C-5, from the comb polymers P2 are the following reaction sequences a), b) and c) which may be applied alone or in combination:

a) reaction of the comb polymer P2 with water and optionally subsequent neutralization. This reaction will lead to functional groups of the formula C-1;

b) reaction of the comb polymer P2 with a diamine of formula $R^3NH$—$R^4$—$NR^5R^6$, where $R^3$, $R^4$, $R^5$ and $R^6$ are as defined above, optionally followed by quaternization. This reaction will lead to repeating units of the formulae C-2 and/or C-3 depending on the reaction conditions;

c) reaction of the comb polymer P2 with an amino alcohol of the formula $R^8NH$—$R^9$—$OH$, where $R^8$ and $R^9$ are as defined above, followed by reaction with polyphosporic acid or phosphorus pentoxide. This reaction will lead to repeating units of the formulae C-2 or C-3.

The reaction conditions for reaction sequences a), b) and c) can be taken e.g. from WO 2007/039603 and WO 2008/080580 and can be applied by analogy to the preparation of comb polymers P having at least one of the repeating units C-1 to C-5.

Suitable bases for performing the neutralization in sequence a) include, but are not limited to alkalimetal hydroxides, such as sodium or potassium hydroxide, alkalimetal carbonates, and hydrogen carbonates, such as potassium carbonate, sodium carbonate, potassium hydrogencarbonate, sodium hydrogencarbonate, ammonia, primary, secondary or tertiary amines, e.g. mono-, di-tri-$C_1$-$C_6$-alkylamines such as dimethyl-amine, diethylamine, triethylamine, tripropylamine, tributylamine, dimethylpropylamine, dimethylbutylamine, dimethyl-isopropylamine, mono-, di and tri-$C_1$-$C_6$-/hydroxy-$C_1$-$C_6$-alkyl amines, such as aminoethanol, aminopropanol, diethanolamine, methyldiethanolamine and the like, but also polymers of the formula II which are also amines.

Polymers of the formula II been described several times as crosslinkers or chain ex-tenders for polyurethanes or epoxys, e.g. in the following patent documents:

Anthranilate functionalized poly(alkylene oxide)s are e.g. known from U.S. Pat. No. 4,180,644, 4,191,706, 4,191,835, 4,247,677, 4,260,729 and US 2003212291. Anthranilate functionalized poly(alkylene oxide)s are used as a crosslinker agent for polyurethane or epoxy coatings.

Anthranilate functionalized polyesters are e.g. known from EP 21569. They are used as a chain extender in the production of polyureas and polyurea-polyurethanes.

Anthranilate functionalized polycarbonates are e.g. known from U.S. Pat. No. 5,231,149. They are used for the production of graft or block copolymers having improved impact and solvent resistance.

Polymers of the formula II which are aliphatic polyethers, in particular poly(alkylene oxides), are e.g. known from U.S. Pat. Nos. 4,180,644, 4,191,706, 4,191,835, 4,247,677, 4,260,729 and US 2003212291.

Polymers of the formula II which are aliphatic polyesters are e.g. known from EP 21569.

Polymers of the formula II which are aliphatic polycarbonates are e.g. known from U.S. Pat. No. 5,231,149.

Polymers of the formula II having pending anthranilate or anthranilamide groups have been also described in PCT/IB2013/051454 to which full reference is made.

Apart from that, polymers of the formula II are preferably obtained by reacting a polymer P' having at least one functional moiety of the formula A-Q-H attached to one of the termini and/or to the backbone of the polymer P' with a compound of the formulae III or IV

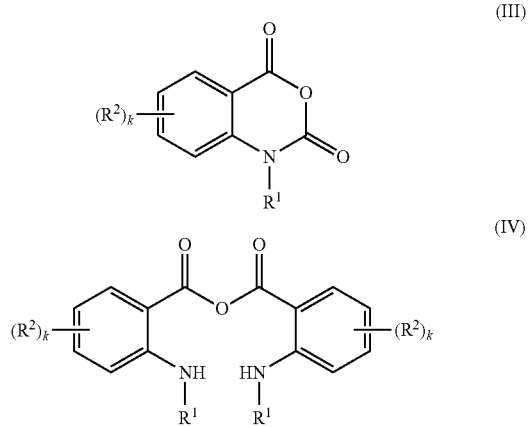

where A, Q, k, $R^1$ and $R^2$ are as defined herein.

Examples of suitable compounds of the formula III are isatoic anhydride, N-methylisatoic anhydride, N-ethylisatoic anhydride, aminoisatoic anhydride, fluoroisatoic anhydride, chloroisatoic anhydride, bromoisatoic anhydride, carboxylic isatoic anhydride, nitroisatoic anhydride, hydroxyisatoic anhydride, methoxyisatoic anhydride, 1-(methylsulfonylmethyl)isatoic anhydride, (4-pyridinyl) isatoic anhydride, 1-phenyl-2H-3,1-benzoxazine-2,4(1H)-dione, chloro-1-ethyl(methyl)-2H-3,1-benzoxazine-2,4 (1H)-dione, isatoic anhydride carboxylic acid methyl ester.

Examples of suitable compounds of the formula IV are isatoic acid anhydride (anhydride of anthranilic acid).

Polymers of the formula II may also be prepared by reacting a polymer P' having at least one functional moiety of the formula A-Q-H attached to one of the termini and/or to the backbone of the polymer P' with a anthranilic acid or an ester thereof of the formula III'

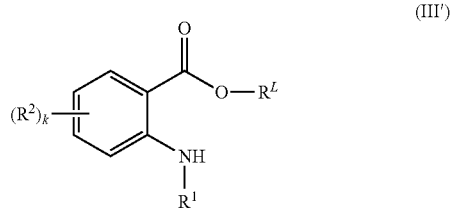

where A, Q, k, $R^1$ and $R^2$ are as defined herein and where $R^L$ is hydrogen or a hydrocarbon radical having 1 to 8 carbon atoms, such as $C_1$-$C_6$-alkyl, phenyl, $C_3$-$C_6$-cycloalkyl or benzyl and wherein $R^L$ is preferably hydrogen or $C_1$-$C_4$-alkyl, especially hydrogen, methyl or ethyl.

The polymer P' forms the moiety X in the polymer of formula II. Hence, the polymer P' is preferably selected from the group consisting of polyesters, in particular aliphatic polyesters, polyethers, in particular poly-$C_2$-$C_4$-alkylene oxides, polycarbonates, in particular aliphatic polycarbonates, and polymers having a C-C-backbone, in particular those which comprise repeating units M1, selected from polymerized $C_1$-$C_{10}$-alkyl (meth)acrylates. The aforementioned polyesters, polyethers, polycarbonates and polymers having a C-C-backbone carry at least one functional moiety of the formula A-Q-H, in particular 1 or 2 functional moieties of the formula A-Q-H, where the functional moieties of the A-Q-H may be bound either to one or more of the termini of the polymer backbone or at any other position of the polymer backbone, preferably to one terminus.

In a particular embodiment of the invention the polymer P' is an aliphatic polyether, e.g. a poly-($C_2$-$C_{10}$-alkylene oxide), in particular a poly-($C_2$-$C_4$-alkylene oxide), especially a poly(ethylene oxide), a poly(propylene oxide) or a poly(ethylene oxide-co-propylene oxide), where in the latter the ethylene oxide and propylene oxide repeating units may be arranged randomly or blockwise. The poly-($C_2$-$C_4$-alkylene oxide) P' carries at least one moiety A-Q-H, in particular an OH or $NH_2$-group, and in particular it carries 1 or 2, moieties A-Q-H. In the polyethers P', the moieties A-Q-H are preferably OH or $NH_2$. The aliphatic polyether P' may be linear or branched.

Polyethers P' are commercially available, e.g. the Jeffamine® grades from Huntsman, the Boltorn® grades from Perstorp, the Pluriol® grades from BASF, the Pluronic® grades from BASF and the Lutensol® grades from BASF.

In another particular embodiment of the invention the polymer P' is an aliphatic polyester, in particular a linear or branched aliphatic polyester P', selected from a) aliphatic polyesters, where the majority, in particular at least 70% of repeating units are units of the polyester backbone are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups; and b) aliphatic polyesters, where the majority, in particular at least 70% of repeating units are units of the polyester backbone are derived from one or more, e.g. 1, 2 or 3 aliphatic $C_4$-$C_{10}$ lactones, or a combination of one or more, e.g. 1, 2 or 3 aliphatic $C_4$-$C_{10}$ lactones with at least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups.

The aliphatic polyesters P' carry at least one moiety A-Q-H, e.g. 1, 2 or 3 moieties A-Q-H.

Polyesters P' are commercially available, e.g. the Boltorn® grades form Perstorp, or they can be prepared by co-condensation of aliphatic $C_2$-$C_{10}$ dicarboxylic acids or ester forming derivatives thereof with $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, or by reacting lactones with hydroxyl compounds having 1, 2, 3, 4, 5 or 6 or more hydroxyl groups.

In a further particular embodiment of the invention the polymer P' is an aliphatic polyetherester, in particular a linear or branched or hyperbranched aliphatic polyetherester, selected from a) aliphatic polyetheresters, where the majority, in particular at least 70% of repeating units are units of the polyester blocks are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxideco-propylene oxides), where in the latter the ethylene oxide and propylene oxide repeating units may be arranged randomly or blockwise; and
b) aliphatic polyetheresters, where the majority, in particular at least 70% of repeating units are units of the polyester blocks are derived from one or more, e.g. 1, 2 or 3 aliphatic $C_4$-$C_{10}$ lactones, or a combination thereof with at least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

The weight ratio of the polyester blocks and the polyether blocks is usually in the range from 1:100 to 100:1, in particular in the range from 1:10 to 10:1.

The aliphatic polyetheresters P' carry at least one moiety A-Q-H, e.g. 1, 2 or 3 moieties A-Q-H, in the polyetheresters P', the moieties A-Q-H are preferably OH or $NH_2$.

Aliphatic polyetheresters P' can be prepared by co-condensation of the aforementioned ester forming monomers with OH terminated aliphatic polyethers, such as poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

In yet a further particular embodiment of the invention the polymer P' is an aliphatic polycarbonate, in particular a linear or branched or hyperbranched aliphatic polycarbonate having a polymer backbone which is a poly-($C_2$-$C_4$-alkylene carbonate), especially a poly(ethylene carbonate), a poly(propylene carbonate) or a poly(ethylene oxide-co-propylene carbonate), where in the latter the ethylene carbonate and propylene carbonate repeating units may be arranged randomly or blockwise. The poly-($C_2$-$C_4$-alkylene carbonate) P' carries at least one moiety A-Q-H, e.g. from 1 to 200 or from 1 to 100 moieties A-Q-H, and in particular it carries 1, 2, 3, or 4 moieties A-Q-H. In the polycarbonates P', the moieties A-Q-H are preferably OH or $NH_2$. The aliphatic polycarbonate P' may be linear or branched or hyperbranched.

Polycarbonates P' are commercially available, e.g. the Oxymer® grades from Perstorp.

In yet a further particular embodiment of the invention the polymer P' is polymer, wherein the polymer backbone essentially consists of carbon atoms, i.e. a polymer having a C-C-backbone, and wherein the polymer backbone and/or at least one of the terminal atoms carry one or more of the functional moieties A-Q-H as defined herein. According to the invention, the polymer P' carries at least one moiety A-Q-H, e.g. 1, 2, or 3 moieties A-Q-H. The polymer P' of this embodiment is made from the aforementioned monomers M1, optionally in combination with monomers M1a, M2 and M3 as defined above.

Polymers P' having a C-C-backbone and carrying at least one group A-Q-H are known, and commercially available, e.g. the Acryflow grades of Lyondell Chem or can be prepared by radical copolymerization of monomers M1 and M2a in the presence of suitable initiators and optionally regulators. Suitable polymers P' are e.g. known from WO 00/40630, WO 03/046029, WO 2006/074969, WO 2011/120947.

Preference is given to polymers P' which have a number average molecular weight $M_N$ in the range from 200 to 50000 Dalton, in particular from 300 to 40000 Dalton, especially from 400 to 30000 Dalton. The weight average molecular weight $M_W$ of the polymer P' is generally in the range from 210 to 200000 Dalton, in particular from 330 to 150000 Dalton, especially from 500 to 100000 Dalton. The polydispersity $P=M_W/M_N$ is generally in the range from 1.05 to 5, preferably from 1.1 to 4 and especially from 1.2 to 3.

The amount of the compound III, III' or IV is generally chosen, such that the molar ratio of the compound II or III to the amount of groups A-Q-H in polymer P' is from 10:1 to 1:10, in particular from 5:1 to 1:5, especially from 3:1 to 1:3.

The reaction of the polymer P' with the compound of formulae III, III' or IV is generally performed in the presence of a suitable catalyst which promotes the reaction of the groups A-Q-H with the carbonyl groups in III, III' or IV. Suitable catalysts include alkalimetal hydroxides, such as sodium or potassium hydroxide, alkalimetal carbonates, such as sodium or potassium carbonate, tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines, such as 4-dimethylaminopyridine, tin compound catalysts, such as dibutyltindioctoate and dibutyltindilaurate.

The amount of catalyst is generally from 0.01 to 2% by weight, in particular from 0.1 to 1% by weight, based on the total amount of polymer P and the compound of formulae III, III' or IV.

The reaction of the polymer P' with the compound of formulae III, III' or IV is generally performed at temperatures ranging form 60 to 180° C., in particular from 80 to 140° C.

The reaction of the polymer P' with the compound of formulae III, III' or IV may be performed in bulk or in solvent. Suitable solvents are those which are inert under reaction conditions, examples including esters, hydrocarbons and mixtures thereof. Preferably, the reaction is performed in bulk, i.e. the concentration of the reactants is at least 90% by weight, based on the weight of the reaction mixture.

The present invention also relates to polymer compositions which are obtained by neutralizing a polymer P3 which is a polymer having at least 0.5 mol-%, in particular at least 1 mol-% and especially at least 5 mol-%, e.g. from 0.5 to 100 mol-% or from 0.5 to 90 mol-%, in particular from 1 to 90 mol-% or from 1 to 70 mol-% and especially from 5 to 60 mol-%, based on the total amount of repeating units in the polymer P3, of repeating units of polymerized monoethylenically unsaturated mono- or dicarboxylic acid (hereinafter repeating units A'), in particular repeating units of polymerized maleic or fumaric acid, with a polymer of formula II. Polymer composition of the polymer P3 which has been neutralized by the polymer of formula II are hereinafter also termed as polymer compositions P3/II.

Suitable repeating units A' are those of polymerized monoethylenically unsaturated monocarboxylic acids having 3 to 6 carbon atoms, such as acrylic or methacrylic acid as well as those of polymerized monoethylenically unsaturated dicarboxylic acids having 4 to 6 carbon atoms, such as maleic acid, fumaric acid and itaconic acid. Preference is given to polymers P3, where the repeating units A' comprise or are exclusively derived from polymerized maleic or fumaric acid.

Besides the repeating units A', the polymers P3 may also comprise repeating units B which are derived from the group of neutral non-functional monoethylenically unsaturated monomers, in particular form the monomers B as defined above in context with repeating units B of the comb polymer P.

Preferably, the repeating units B in the copolymer P3 are derived from at least one polymerized monoethylenically unsaturated monomer selected from the group consisting of
monovinylaromatic monomers, especially styrene;
$C_4$-$C_{18}$-olefins, especially 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;
$C_1$-$C_{20}$-alkylvinyl ethers;
vinyl esters of $C_1$-$C_{20}$-alkanoic acids;
$C_1$-$C_{20}$-alkyl and $C_3$-$C_{10}$-cycloalkyl esters of acrylic acid;
$C_1$-$C_{20}$-alkyl and $C_3$-$C_{10}$-cycloalkyl esters of methacrylic acid, and
di-$C_1$-$C_{20}$-alkyl and di-$C_3$-$C_{10}$-cycloalkyl esters of itaconic acid;
and mixtures of these monomers.

Especially, the repeating units B in the polymer P3 are derived from at least one polymerized monoethylenically unsaturated monomer selected from the group consisting of
monovinylaromatic monomers, especially styrene, and
$C_4$-$C_{18}$-olefins, especially 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;
and mixtures of these monomers.

The amount of repeating units derived form monomers B may be 0%, but will be frequently at least 10 mol-%, in particular at least 30 mol-%, especially at least 40 mol-%, e.g. from 0 to 99.5 mol-% or from 10 to 99.5 mol-% or from 10 to 99 mol-%, in particular from 30 to 99 mol-% or from 30 to 98 mol-% and especially from 40 to 95 mol-% or from 40 to 90 mol-%, based on the total number of repeating units in the polymer P3.

A very preferred embodiment relates to polymers P3 which are copolymers of styrene and maleic acid, in particular a copolymer comprising 1 to 70 mol-%, in particular 2 to 50 mol-% of polymerized maleic acid and from 30 to 99 mol-%, in particular from 50 to 98 mol-% of styrene, based on the total amount of monomers forming the copolymer P3.

Preference is given to polymers P3 which have a number average molecular weight $M_N$ in the range from 500 to 100000 Dalton, in particular from 750 to 75000 Dalton, especially from 900 to 50000 Dalton. The weight average molecular weight $M_W$ of the polymer P3 is generally in the range from 550 to 500000 Dalton, in particular from 850 to 300000 Dalton, especially from 1000 to 150000 Dalton. The polydispersity $M_W/M_N$ is generally in the range from 1.05 to 5, preferably from 1.1 to 4 and especially from 1.2 to 3.

Principally, the relative amounts of polymers P3 and II may be chosen, such that the amount of polymer of formula II is at least 10 mol-% and especially at least 20 mol-% or at least 50 mol-%, based on the amount of carboxyl groups in the polymer P3. The amount of the polymer of the formula II will generally not exceed 200 mol-% based on the amount of carboxyl groups in the polymer P3.

As pointed out above, the thus obtained comb polymers P as well as the polymer composition of the polymer P3 which has been neutralized by the polymer of formula II, are particularly suitable as dispersants, in particular as dispersants for fine particulate solids, such as pigments and fillers.

The invention also relates to liquid compositions of fine particulate solids which contain at least one comb polymer P as a dispersant.

The invention also relates to liquid compositions of fine particulate solids which contain at least one polymer composition of the polymer P3 which has been neutralized by the polymer of formula II as a dispersant.

The comb polymers P as well as the polymer compositions P3/II can be used as dispersant in a broad application fields, such as coatings, inks, electronic materials, especially in low temperature and low viscosity applications. The comb polymers P can be used in solvent based systems, such as in solvent based organic and inorganic pigments dispersion, e.g. in alkyd, CAB (cellulose acetate butyrate), UV (Ultraviolet) and TPA (thermoplastic acrylate) paint systems, in general industrial coatings especially in automotive coatings, as well as in printing inks and graphic arts.

The invention relates in particular to liquid compositions in the form of a dispersion comprising a fine particulate solid material, in particular a pigment or filler which is dispersed in a liquid diluent which composition further contains a comb polymer P as defined herein.

The invention also relates in particular to liquid compositions in the form of a dispersion comprising a fine particulate solid material, in particular a pigment or filler which is dispersed in a liquid diluent which composition further contains a polymer composition P3/II as defined herein.

The invention relates in particular to liquid compositions in the form of a liquid coating composition which comprises a fine particulate solid material, in particular a pigment or filler which is dispersed in a liquid diluent which composition further contains a comb polymer P or a polymer composition P3/II as defined herein and a binder polymer or prepolymer.

The invention also relates in particular to liquid compositions in the form of a liquid ink composition which comprises a fine particulate solid material, in particular a pigment or filler which is dispersed in a liquid diluent which composition further contains a comb polymer P or a polymer composition P3/II as defined herein and a binder polymer or prepolymer.

Suitable solid fine particular materials include, but are not limited to the group consisting of pigments and fillers. Pigments may be inorganic or organic. Pigments include colored pigments and pearlescents.

The size of the fine particulate material is preferably in the micrometer range, e.g. the weight average particle diameter may range from 1 µm to 2000 µm, in particular from 2 µm to 1000 µm or from 5 µm to 500 µm. The weight average particle diameter may be determined by sieving analysis. The weight average particle diameter may be also be determined by light scattering methods.

Examples of suitable organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perinonones, anthraquinones, such as aminoanthraquinones or hydroxyanthraquinones, anthrapyrimidines, indanthrones, flay-enthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" 2$^{nd}$ *Edition,* 1995, VCH Verlagsgesellschaft, ISBN: 3-527-28744-2.

Examples of suitable inorganic pigments are e.g. metallic flakes, such aluminium, aluminium oxide, calcium carbonate, silicon oxide and silicates, iron(III)oxide, chromium(III) oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

Suitable fillers are calcium carbonate, silicates, glass fibres, glass beads, talc, kaolin, mica, barium sulphate, metal oxides and hydroxides, carbon black, graphite, wood powders, powders and fibres of other natural products, synthetic fibres.

The liquid diluent present in the dispersion will depend on the field of application in a known manner. The dispersants of the invention are particular useful in dispersions, where the diluent is selected from commonly used solvents in coatings technology. For water based formulations the diluent comprises water and may, aside from water, further comprise polar, water-miscible solvents such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For solvent based formulations, preferably less polar solvents like aliphatic hydrocarbons, esters like butyl acetate, or glycol ethers like methoxypropylene glycol or glycol ether esters like methoxypropylene glycol acetate are used and mixtures thereof are used as liquid diluents.

Preferably, the weight ratio of fine particulate solid material to comb polymer P in the liquid composition may range from 100:1 to 1:50, in particular from 30:1 to 1:10.

Preferably, the weight ratio of fine particulate solid material to polymer composition P3/II, calculated as polymer P3+polymer of formula II, in the liquid composition may range from 100:1 to 1:50, in particular from 30:1 to 1:10.

In a particular embodiment of the invention, the liquid composition comprises
i) 1 to 70% by weight, in particular 2 to 50% by weight, based on the total weight of the liquid composition, of at least one fine particulate solid material, selected from the group consisting of pigments and fillers;
ii) 0.5 to 50% by weight, in particular from 1 to 30% by weight, based on the total weight of the liquid composition, of at least one comb polymer P as defined herein or a polymer composition P3/II, calculated as polymer P3+polymer of formula II;
iii) 10 to 98.5%, in particular from 20 to 97% by weight, based on the total weight of the liquid composition, of at least one liquid diluent.

Depending on the intended use, the liquid composition may further comprise binders and/or one or more conventional additives depending on the intended use. Conventional additives included e.g. plasticisers, lubricants, emulsifiers, humectants, rheology additives, catalysts, flow auxiliaries, optical brighteners, flame retardants, preservatives, antistatic agents or blowing agents.

The liquid dispersion may be in the form of a mill base. Such a millbase contains the fine particulate solid, the comb polymer P or the polymer composition P3/II and the liquid diluent and optionally additives but generally mill base will not contain binders.

The liquid dispersion may also be in the form of a coating composition. Such a coating composition contains the fine particulate solid, the comb polymer P or the polymer composition P3/II and the liquid diluent and additionally one or more binders, e.g. film-forming polymers or prepolymers which form a film upon curing. Coating composition may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

The liquid dispersion may also be in the form of an ink, e.g. a printing ink or a gravure ink. Such an ink contains the fine particulate solid, the comb polymer P or the polymer composition P3/II and the liquid diluent and additionally one or more binders conventionally used in ink technology, e.g. film-forming polymers or prepolymers which form a film upon curing. Coating composition may optionally contain conventional additives, e.g. plasticisers, lubricants, emulsifiers, humectants, rheology additives, humectants, preservatives and antistatic agents.

Suitable binders are the ones customarily used, for example the ones described in *Ullmann's Encyclopedia of Industrial Chemistry*, 5th Edition, Vol. A18, pp. 368-426, VCH, Weinheim 1991, Germany. In general, the film-forming binder is based on a thermoplastic or thermosetting resin, predominantly on a thermosetting resin. Exam-pies thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, In *Ullmann's*, Vol. A18, loc. cit., p. 469.

Preference is given to coating compositions comprising a comb polymer P or the polymer composition P3/II and a cross linkable resin. Examples of coating compositions containing specific binders are:
Paints based on cold- or hot-cross linkable alkyd, acrylate, polyester, epoxy or melamine resins or mixtures of such resins, if desired with addition of a curing catalyst;
Two-component polyurethane paints based on hydroxyl-containing acrylate, polyester or polyether resins and aliphatic or aromatic isocyanates, isocyanurates or polyisocyanates;
One-component polyurethane paints based on blocked isocyanates, isocyanurates or polyisocyanates which are deblocked during baking, if desired with addition of a melamine resin;
One-component polyurethane paints based on a trisalkoxycarbonyl triazine cross linker and a hydroxyl group containing resin, such as acrylate, polyester or polyether resins;
One-component polyurethane paints based on aliphatic or aromatic urethane acrylates or polyurethane acrylates having free amino groups within the urethane structure and melamine resins or polyether resins, if necessary with curing catalyst;
Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

In a first embodiment, the coating composition preferably comprises 0.01 to 100.0 parts by weight of the combined components i) and ii), i.e. fine particulate solid and comb polymer P in the composition, in particular 0.05 to 50.0 parts, especially 0.1 to 20.0 parts, per 100 parts by weight of solid binder.

In another embodiment, the coating composition preferably comprises 0.01 to 100.0 parts by weight of the combined components i) and ii), i.e. fine particulate solid and the polymer composition P3/II, calculated as polymer P3+polymer of formula II, in the composition, in particular 0.05 to 50.0 parts, especially 0.1 to 20.0 parts, per 100 parts by weight of solid binder.

For preparing the liquid composition of the invention, the pigments are generally dispersed in the liquid diluent in the presence of the comb polymer P or the polymer composition P3/II. The dispersion can be achieved by using conventional techniques, such as high speed mixing, ball milling, sand grinding, attritor grinding or two or three roll milling. The resulting pigment dispersion may have a pigment to dispersant weight ratio in the above range. The thus obtained dispersion is also termed as a millbase.

For preparing the coating composition or an ink the millbase will generally be incorporated, e.g. by mixing, into a liquid composition of the binder. It is, however, also possible to disperse the fine particulate solid, in a solution of the comb polymer P or the polymer composition P3/II, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of fine particulate solid and comb polymer P or polymer composition P3/II, respectively, is easy to disperse and does not require time and energy intensive grinding to be incorporated into e.g. a paint formulation.

The invention is hereinafter also described by way of examples.

Preparation Examples

Abbreviations n-BA n-butyl acrylate
DBTL dibutyltin dilaurate
MSA Maleic anhydride
IA isatoic anhydride
$M_n$ Number average molecular weight
$M_w$ Weight average molecular weight
PD Polydispersity ($M_w/M_n$)

TABLE 1

| Commercially available Polymers P' used: | |
|---|---|
| Name of Polymer P' | Supplier |
| Pluriol ® A500E (Methyl polyethylene glycol, molecular mass approx. 500 g/mol) | BASF |
| Pluriol ® A350E (Methyl polyethylene glycol, molecular mass approx. 350 g/mol) | BASF |
| Lutensol ® ON 110 ($C_{10}$-Oxo alcohol ethoxylate, molecular mass approx. 640 g/mol) | BASF |
| SMA2000 resin (Styrene-MSA copolymer, Molar ratio Styrene:MSA 2:1 | Cray Valley |

Molecular weights were determined by gel permeation chromatography GPC using a "Waters 1515GPC" equipment with three columns (Styragel HR3, HR4, HR4E). The measurements were performed by using (tetrahydrofurane as eluent (1.0 ml/min) at 35° C. Polystyrene was used for calibration.

The following intermediate polymers 1 to 5 of the formula II were prepared as starting materials for the comb polymers P:

Intermediate Polymer 1

The mixture of Pluriol A500E (BASF) 50.0 g (0.1 mol OH), isatoic anhydride (IA) 16.3 g (0.1 mol) and 4-dimethylaminopyridine 0.2 g (0.3 wt %) were heated to 80 to 140° C. until no more formation of gas ($CO_2$) could be observed. The obtained product was a yellowish liquid with an amine number of 90 mgKOH/g.

Intermediate Polymer 2

The mixture of Lutensol ON 110 (BASF) 64.0 g (0.1 mol OH), IA 16.3 g (0.1 mol) and 4-dimethylaminopyridine 0.25 g (0.3 wt %) were heated to 80 to 140° C. until no more formation of gas ($CO_2$) could be observed. The obtained product was a yellowish liquid with an amine number of 74 mgKOH/g.

Intermediate Polymer 3

The mixture of steary alcohol 27.0 g (0.1 mol), ε-caprolactone 137.0 g (1.2 mol), δ-valerolactone 120 g (1.2 mol), and dibutyltin dilaurate 0.2 g were heated under nitrogen at 160° C. until the solid content was 97%. Then, IA 16.3 g (0.1 mol) and 4-dimethylaminopyridine 0.5 g (0.3 wt %) were heated to 80 to 140° C. until no more formation of gas ($CO_2$) could be observed. The obtained product was a yellowish liquid with an amine number of 19 mgKOH/g.

Intermediate Polymer 4

The mixture of Poly(nBA30)-OH (prepared according to example 1 of WO 2011/120947) 50.0 g (0.01 mol), and IA 1.63 g (0.01 mol) and 4-dimethylaminopyridine 0.15 g (0.3 wt %) was heated to 80 to 140° C. until no more formation of gas ($CO_2$) could be observed. The obtained product was a yellowish liquid with an amine number of 11 mgKOH/g.

Intermediate Polymer 5

The mixture of Pluriol A350E (BASF) 35.0 g (0.1 mol), ε-caprolactone 45.7 g (0.4 mol), δ-valerolactone 10 g (0.1 mol), and dibutyltin dilaurate 0.05 g were heated under nitro-gen to 160° C. until the solid content was 97%. Then, IA 16.3 g (0.1 mol) and 4-dimethylaminopyridine 0.3 g were added and the mixtures were heated to 80 to 140° C. until no more formation of gas ($CO_2$) could be observed. The obtained product was a yellowish liquid with an amine number of 50 mgKOH/g.

Comb Polymers P

Polymer 1

61 g SMA2000 resin were dissolved in 60 g methoxypropylacetate and slowly mixed with 62.0 g (0.1 mol) of Intermediate Polymer 1. Then the mixture was heated to 60~140° C. until the amine number was lower than 10 mgKOH/g polymer. The methoxypropylacetate was distilled out during this process. $M_n$=2100 g/mol, PD=1.80.

Polymer 2

61 g SMA2000 resin were dissolved in 60 g methoxypropylacetate and slowly mixed with 76.0 g (0.1 mol) of Intermediate Polymer 2. Then the mixture was heated to 60~140° C. until the amine number was lower than 10 mgKOH/g polymer. The methoxypropylacetate was distilled out during this process. $M_n$=2650 g/mol, PD=1.75.

Polymer 3

31 g SMA2000 resin were dissolved in 60 g methoxypropylacetate and slowly mixed with 148.0 g (0.05 mol) or Intermediate Polymer 3. Then the mixture was heated to 60~140° C. until the amine number was lower than 5 mgKOH/g polymer. The methoxypropylacetate was distilled out during this process. $M_n$=3450 g/mol, PD=2.50.

Polymer 4

31 g SMA2000 resin were dissolved in 60 g methoxypropylacetate and slowly mixed with 250 g (0.05 mol) of Intermediate Polymer 4. Then the mixture was cooked at 60~140° C. until the amine number lower than 3 mgKOH/g polymer. The methoxypropylacetate was distilled out during this process. $M_n$=6500 g/mol, PD=2.10.

Polymer 5

31 g SMA2000 resin (from Cray Valley) are dissolved in 60 g methoxypropylacetate and slowly mixed with Intermediate Polymer 5 52 g (0.05 mol). Then the mixture was heated to 60~140° C. until the amine number was lower than 5 mgKOH/g polymer. The methoxypropylacetate was distilled out during this process. $M_n$=2250 g/mol, PD=1.95.

Polymer 6

A mixture of 20 g of polymer 1 and 30 g water were mixed and heated to 80° C. for 2 hours. A yellowish aqueous solution of polymer 6 was obtained which was used as dispersant agent 1.

Polymer 7

A mixture of 20 g of polymer 2 and 30 g water were mixed and heated to 80° C. for 2 hours. A yellowish water solution of polymer 7 was obtained which was used as dispersant agent 2.

Polymer 8

A mixture of 20 g of polymer 3, 2 g water and 28 g methoxypropylacetate were heated to 80° C. for 2 hours. A yellowish solution of polymer 8 was obtained which was used as dispersant agent 3.

Polymer 9

A mixture of 20 g of polymer 4, 2 g water and 28 g methoxypropylacetate were heated to 80° C. for 2 hours. A yellowish solution of polymer 9 was obtained which was used as dispersant agent 4.

Polymer 10:

A mixture of 20 g of polymer 5, 2 g water and 28 g methoxypropylacetate were heated to 80° C. for 2 hours. A yellowish solution of polymer 9 was obtained which was used as dispersant agent 5.

Polymer Composition 1

50 g of the solution of polymer 6 (Dispersant agent 1, 20 g pure polymer 6) was neutralized with 10 g of Intermediate Polymer 1. Then 15 g of water were added to the mixture to obtain a 40 wt % yellowish aqueous solution which was used as dispersant agent 6.

Polymer 11:

41 g of polymer 1 were dissolved in 40 g methoxypropylacetate and slowly mixed with 2 g of 2-aminoethanol at 22° C. The mixture was heated to 60 to 140° C. until the amine number was below 10 mgKOH/g polymer. During the heating methoxypropylacetate distilled off. Then 3.5 g of polyphosphoric acid were added and the reaction mixture was heated to 80° C. for 3 hours. The mixture was diluted by addition of 65 g of water to obtain a 40 wt % yellowish aqueous solution. The thus obtained solution was used as dispersant agent 7.

Polymer P12

41 g of polymer 1 were dissolved in 40 g methoxypropylacetate and slowly mixed with 3 to 3.3 g of dimethylaminopropylamine at 22° C. The mixture was heated to 60 to 140° C. until the amine number was below 50 mgKOH/g polymer. During the heating methoxypropylacetate distilled off. Then 5.2 g of 2-chlorobenzyl chloride were added and the reaction mixtures were heated to 80° C. for 6 hours. The mixture was diluted by addition of 75 g of water to obtain a 40 wt % yellowish aqueous solution. The thus obtained solution was used as dispersant agent 8.

Polymer Composition 2

50 g of the solution of polymer 6 (Dispersant agent 1, 20 g pure polymer 6) was neutralized with 12 g of Intermediate Polymer 2. Then 18 g of water were added to the mixture to obtain a 40 wt % yellowish aqueous solution which was used as dispersant agent 9.

Polymer Composition 2

50 g of the solution of polymer 6 (Dispersant agent 1, 20 g pure polymer 6) was neutralized with 12 g of Intermediate Polymer 2. Then 18 g of water were added to the mixture to obtain a 40 wt % yellowish aqueous solution which was used as dispersant agent 9.

Polymer P13

50 g of the solution of polymer 6 (Dispersant agent 1, 20 g pure polymer 6) was neutralized with 1 g NaOH 2. A yellowish water solution was obtained which was used as dispersant agent 10.

Performance Tests

First, competitive dispersants were synthesized according to example 10 of WO 2008/080580.

In order to test the dispersant effect of the obtained dispersants, binder free pigment concentrates (millbase) were prepared according to the Formulation 1 below. The millbase was dispersed in Scandex Shaker for 1 h with the help of glass beads. After-wards, the millbase was filtered and stored at room temperature overnight.

Formulation 1. Preparation of Pigment Concentrates

| 1) | Dispersant (40% solid) | 0.82 g |
| 2) | Water | 16.5 g |
| 3) | Pigment: Kronos 2190, $TiO_2$ Pigment | 32.5 g |
| 4) | Paraffine based defoamger Foamaster ® 8034 | 0.18 g |
| 5) | 2.0 mm glass beads | 100 g |
| | Total | 150 g |

Let-down (Formulation 2) paints were prepared by mixing the ingredients in a high shear mixer at 23° C. at 2000 rpm for 5 minutes. The let down paints were applied on white/black card with a 250 μm film thickness.

Formulation 2. Let-Down System

| | Chemistry | |
|---|---|---|
| Millbase | 21.0 g | Formulation 1 |
| Omyacarb 5 GU | 15.4 g | calcium carbonate |
| Finntalc M15 | 4.00 g | Talc |
| Klarlack 436 | 38.2 g | Acrylate based aqueous coting composition[1)] |
| Water | 1.4 g | |
| Total | 80.0 g | |

[1)]Composition of Klarlack 436

| % b.w. | Ingredients |
|---|---|
| 1 | Paraffin based defoamer Foammaster ® 8034 (Cognis) |
| 2.5 | Propylene glycol |
| 2.5 | Butyl diglycol |
| 87 | Acrylate latex Acronal ® A 684, BASF SE |
| 4 | Polyether based Rheologoy modifier DSX ® 3000 of BASF SE |
| 3 | Water |

The performance of dispersants were tested according to Formulations 1 and 2. The rheological behavior of the millbases was measured with a Thermo-Haake RheoStress 600 equipment under the CR mode with rotation speed of 1 sec$^{-1}$ using a cone-plate sensor. The spreading rate of the let-down paints were determined in accordance with ISO 6504-1.

The performance of the dispersants was generally very good with satisfactory results, e.g. low millbase viscosity, and high opacity efficiency (high spreading rate) (Table 1).

TABLE 1

| | The dispersion effects | |
|---|---|---|
| Example | Viscosity @1 s$^{-1}$ [mPas] | Spreading rate @ 98% contrast ratio [m$^2$/L] |
| Blank without dispersant[1)] | 1050 | 5.73 |
| Competitiver product A[2)] | 50 | 6.35 |
| Dispersant agent 1 | 60 | 6.38 |
| Dispersant agent 2 | 500 | 6.51 |
| Dispersant agent 5 | 350 | 6.51 |
| Dispersant agent 6 | 400 | 6.67 |
| Dispersant agent 7 | 80 | 6.42 |
| Dispersant agent 8 | 100 | 6.53 |
| Dispersant agent 9 | 150 | 6.61 |
| Dispersant agent 10 | 50 | 6.59 |

Competitive product A is prepared according to US 20100022662, Ex. 10

We claim:

1. A comb polymer, comprising:
at least 0.5 mol %, based on a total amount of repeating units in the comb polymer, of a first repeating unit A, which is at least one selected from the group consisting of formula Ia and formula Ib:

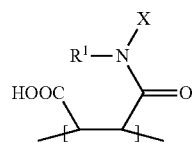

(Ia)

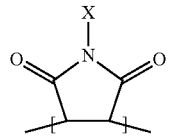

(Ib)

wherein
R$^1$ is selected from the group consisting of a hydrogen, —S(=O)$_2$R$^a$, a C$_1$-C$_{20}$ alkyl, a C$_3$-C$_{10}$ cycloalkyl, an aryl, a heteroaryl, an aryl-C$_1$-C$_4$-alkyl and a heteroaryl-C$_1$-C$_4$-alkyl, where the aryl, the heteroaryl, the aryl-C$_1$-C$_4$-alkyl and the heteroaryl-C$_1$-C$_4$-alkyl are unsubstituted or substituted by at least one radical selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^a$, a C$_1$-C$_4$ alkyl, a C$_1$-C$_4$ alkoxy and a halogen; and
X indicates a polymer group of the following formula X:

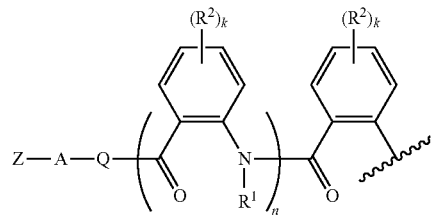

(X)

wherein
Z indicates a polymer segment, a monovalent alkyl group comprising 10 to 100 carbon atoms or an alkenyl group comprising 10 to 100 carbon atoms;
k is 0, 1, 2, 3 or 4;
n is 0, 1 or 2;
A is a chemical bond or a divalent moiety selected from the group consisting of a C$_1$-C$_6$ alkylene, a —O—(C$_2$-C$_6$ alkylene) and a —C(=O)—O—(C$_2$-C$_6$ alkylene) which has the C$_2$-C$_6$ alkylene part attached to Q;
Q is a divalent moiety selected from the group consisting of —O—, —NH— and —S—;
R$^2$ is independently selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^a$, a C$_1$-C$_{20}$ alkyl, a C$_1$-C$_4$ alkoxy, a halogen, an aryloxy, an aryl, and a heteroaryl, where the aryl, the heteroaryl and the aryloxy are unsubstituted or substituted by at least one radical selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^a$, a C$_1$-C$_4$ alkyl, a C$_1$-C$_4$ alkoxy and a halogen; and
wherein
R$^a$ is selected from the group consisting of —OH, —NH$_2$, —NH(C$_1$-C$_6$ alkyl), —N(C$_1$-C$_6$ alkyl)$_2$, a C$_1$-C$_4$ alkyl, a C$_1$-C$_4$ alkoxy, an aryl and a heteroaryl, where the aryl and the hetaryl are unsubstituted or substituted by at least one radical selected from the group consisting of a C$_1$-C$_4$ alkyl, a C$_1$-C$_4$ alkoxy and a halogen.

2. The comb polymer of claim 1, further comprising:
a second repeating unit of a polymerized monoethylenically unsaturated monomer, which is a neutral non-functional monoethylenically unsaturated monomer.

3. The comb polymer of claim 2, wherein the second repeating unit is selected from the group consisting of a polymerized styrene, a C$_4$-C$_{18}$-olefin, and mixtures thereof.

4. The comb polymer of claim 2, comprising:
0.5 mol % to 90 mol % of the first repeating unit;
10 mol % to 99.5 mol % of the second repeating unit; and
further comprising:

0 mol % to 50 mol % of a third repeating unit, which is different from the first repeating unit and the second repeating unit;
wherein each amount is based on the total number of repeating units in the comb polymer.

5. The comb polymer of claim 1, wherein
k is 0 or 1;
n is 0;
A is a chemical bond or a divalent moiety selected from the group consisting of —C(=O)—O—($C_2$-$C_4$ alkylene) which has the $C_2$-$C_4$ alkylene part attached to Q and C(=O)—NH—($C_2$-$C_4$ alkylene) which has the $C_2$-$C_4$ alkylene part attached to Q;
Q is a divalent moiety selected from the group consisting of —O— and —NH—;
$R^1$ is selected from the group consisting of a hydrogen, a $C_1$-$C_4$ alkyl and a phenyl;
$R^2$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^a$, a $C_1$-$C_4$ alkyl, a $C_1$-$C_4$ alkoxy, a halogen, a phenyl and a pyridyl;
$R^a$ is selected from the group consisting of —NH$_2$, —NH($C_1$-$C_6$ alkyl), —N($C_1$-$C_6$ alkyl)$_2$ and a $C_1$-$C_4$ alkyl.

6. The comb polymer of claim 1, wherein Z is selected from the group consisting of an alkyl group comprising 10 to 100 carbon atoms, an aliphatic polyester, an aliphatic polyether, an aliphatic polyether ester, an aliphatic polycarbonate and a polymer comprising:
a C-C-backbone; and
a $C_1$-$C_{20}$-alkoxycarbonyl moiety attached to the C-C-backbone.

7. The comb polymer of claim 6, wherein Z is a poly-($C_2$-$C_{10}$-alkylene oxide).

8. The comb polymer of claim 6, wherein Z is an aliphatic polyester or an aliphatic polyether ester.

9. The comb polymer of claim 6, wherein Z is an aliphatic polycarbonate.

10. The comb polymer of claim 6, wherein Z is a polymer segment comprising:
a C—C-backbone, and
a fourth repeating unit, which is a polymerized $C_1$-$C_{20}$-alkyl (meth)acrylate.

11. The comb polymer of claim 1, wherein Z is a polymer segment which has a number average weight in a range of 200 Dalton to 50000 Dalton.

12. The comb polymer of claim 1, further comprising:
a fifth repeating unit a formula selected from the group consisting of formula C-1, formula C-2, formula C-3, formula C-4, formula C-5 and mixtures thereof:

(C-1)

(C-2)

(C-3)

(C-4)

(C-5)

where
$R^3$, $R^8$ are each independently a hydrogen or a monovalent hydrocarbon radical comprising 1 to 24 carbon atoms;
$R^4$ is a bivalent alkandiyl radical comprising 2 to 24 carbon atoms;
$R^5$, $R^6$, $R^7$ are identical or different and selected from the group consisting of an alkyl comprising 1 to 15 carbon atoms, a cycloalkyl comprising 6 to 12 carbon atoms, a substituted or an unsubstituted aryl and a substituted or an unsubstituted aryl-$C_1$-$C_4$-alkyl, where at least one of $R^5$, $R^6$, $R^7$ is optionally hydrogen, and
$R^9$ is a bivalent radical selected from the group consisting of an alkandiyl radical comprising 2 to 24 carbon atoms and an O-alkandiyl radical comprising 2 to 24 carbon atoms, where the O-alkandiyl radical comprises an oxygen atom bound to the phosphorus atom.

13. A process for preparing the comb polymer of claim 1, the process comprising:
reacting a first polymer comprising at least 0.5 mol %, based on the total amount of repeating units in the first polymer, of a repeating unit of polymerized maleic anhydride with a polymer of formula II:

(II)

to obtain a precursor comb polymer to the comb polymer.

14. The process of claim 13, wherein the first polymer is a copolymer of styrene and maleic anhydride.

15. The process of claim 13, further comprising:
performing at least one reaction selected from the group consisting of:
reacting the precursor comb polymer with water and optionally subsequent neutralization;

reacting the precursor comb polymer with a diamine of formula $R^3NH—R^4—NR^5R^6$, followed by quaternization, where $R^3$ is a hydrogen or a monovalent hydrocarbon radical comprising 1 to 24 carbon atoms;

$R^4$ is a bivalent alkandiyl radical comprising 2 to 24 carbon atoms;

$R^5$ and $R^6$ are identical or different and selected from the group consisting of an alkyl comprising 1 to 15 carbon atoms, a cycloalkyl comprising 6 to 12 carbon atoms, a substituted or an unsubstituted aryl and a substituted or an unsubstituted aryl-$C_1$-$C_4$-alkyl, where at least one of $R^5$ and $R^6$ is optionally a hydrogen;

reacting the precursor comb polymer with an amino alcohol of the formula $R^8NH—R^9—OH$, followed by reacting with polyphosphoric acid or phosphorus pentoxide, where $R^8$ is a hydrogen or a monovalent hydrocarbon radical comprising 1 to 24 carbon atoms;

$R^9$ is a bivalent radical selected from the group consisting of an alkandiyl radical comprising 2 to 24 carbon atoms and an O-alkandiyl radical comprising 2 to 24 carbon atoms, where the O-alkandiyl radical comprises an oxygen atom bound to the phosphorus atom.

16. A polymer composition, which is obtained by a process comprising:

neutralizing a second polymer with a polymer of formula II:

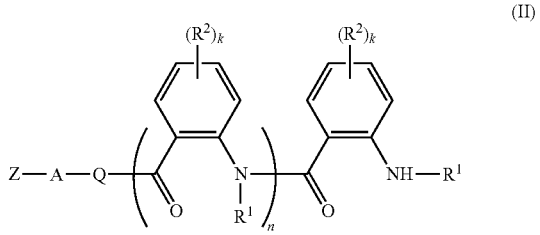

wherein the second polymer comprises a repeating unit of polymerized monoethylenically unsaturated monocarboxylic acid or dicarboxylic acid in an amount that is at least 0.5 mol %, based on a total amount of repeating units in the second polymer, and Z, A, Q, k, n, $R^1$ and $R^2$, are as defined in claim 1.

17. The polymer composition of claim 16, wherein the repeating unit in the second polymer is a unit of polymerized maleic acid.

18. The polymer composition of claim 17, wherein the second polymer is obtained by a process comprising:

reacting a third polymer comprising at least 0.5 mol %, based on the total amount of repeating units in the second polymer, a repeating unit of polymerized maleic anhydride, with water.

19. A method for dispersing fine particulate solids, comprising:

employing the comb polymer of claim 1 as a dispersing agent or a wetting agent for fine particulate solids in a liquid composition.

20. A liquid composition, comprising:

a fine particulate solid material, which is at least one selected from the group consisting of a pigment and a filler, and a liquid diluent comprising the comb polymer of claim 1, wherein the fine particulate solid material is dispersed in the liquid diluent, wherein the liquid composition is in a form of a dispersion.

21. The liquid composition of claim 20, wherein a weight ratio of the fine particulate solid material to the comb polymer, calculated as solids, is in a range of 1000:1 to 1:50.

22. The liquid composition of claim 20, further comprising:

1% to 70% by weight, based on a total weight of the liquid composition, of a fine particulate solid material;

0.1% to 50% by weight, based on the total weight of the liquid composition, of the comb polymer, calculated as solids; and 10% to 98.5% by weight, based on the total weight of the liquid composition, of a liquid diluent.

23. The liquid composition of claim 20, which is in a form of a mill base.

24. The liquid composition of claim 20, which is in a form of a coating composition.

25. The liquid composition of claim 20, which is in a form of an ink.

* * * * *